United States Patent
Carlough et al.

(10) Patent No.: US 10,725,780 B2
(45) Date of Patent: *Jul. 28, 2020

(54) CONVERT TO ZONED FORMAT FROM DECIMAL FLOATING POINT FORMAT

(71) Applicant: INTERNATIONAL BUSINESS MACHINES CORPORATION, Armonk, NY (US)

(72) Inventors: Steven R. Carlough, Wappingers Falls, NY (US); Reid T. Copeland, Markham (CA); Charles W. Gainey, Jr., Poughkeepsie, NY (US); Marcel Mitran, Markham (CA); Eric M. Schwarz, Gardiner, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

This patent is subject to a terminal disclaimer.

(21) Appl. No.: 15/083,362

(22) Filed: Mar. 29, 2016

(65) Prior Publication Data
US 2016/0210152 A1 Jul. 21, 2016

Related U.S. Application Data

(63) Continuation of application No. 14/560,639, filed on Dec. 4, 2014, now Pat. No. 9,335,995, which is a (Continued)

(51) Int. Cl.
*G06F 9/30* (2018.01)
*G06F 7/483* (2006.01)

(52) U.S. Cl.
CPC .......... *G06F 9/30181* (2013.01); *G06F 7/483* (2013.01); *G06F 9/3001* (2013.01);
(Continued)

(58) Field of Classification Search
CPC .................................................. G06F 9/30025
See application file for complete search history.

(56) References Cited

U.S. PATENT DOCUMENTS 3,872,442 A 3/1975 Boles et al.
4,001,570 A 1/1977 Gooding et al.
(Continued)

FOREIGN PATENT DOCUMENTS

CN 1846193 10/2006
CN 1933334 3/2007
CN 102298515 12/2011

OTHER PUBLICATIONS

SimoTime Zoned Decimal Format, Mar. 14, 2010, 14 pages, [retrieved from the internet on Nov. 24, 2017], retrieved from URL <www.simotime.com/datazd01.htm and www.simotime.com/datapk01.htm>.*

(Continued)

*Primary Examiner* — Jyoti Mehta
(74) *Attorney, Agent, or Firm* — Steven Chiu; Matthew M. Hulihan; Heslin Rothenberg Farley & Mesiti PC

(57) ABSTRACT

Machine instructions, referred to herein as a long Convert from Zoned instruction (CDZT) and extended Convert from Zoned instruction (CXZT), are provided that read EBCDIC or ASCII data from memory, convert it to the appropriate decimal floating point format, and write it to a target floating point register or floating point register pair. Further, machine instructions, referred to herein as a long Convert to Zoned instruction (CZDT) and extended Convert to Zoned instruction (CZXT), are provided that convert a decimal floating point (DFP) operand in a source floating point register or floating point register pair to EBCDIC or ASCII data and store it to a target memory location.

10 Claims, 14 Drawing Sheets

Related U.S. Application Data continuation of application No. 13/339,526, filed on Dec. 29, 2011, now Pat. No. 9,329,861.

(52) U.S. Cl.
CPC ...... *G06F 9/30025* (2013.01); *G06F 9/30036* (2013.01); *G06F 9/30098* (2013.01)

(56) References Cited

U.S. PATENT DOCUMENTS

| | | | |
|---|---|---|---|
| 4,141,005 | A | 2/1979 | Bonner et al. |
| 4,462,102 | A | 7/1984 | Povlick |
| 5,268,855 | A | 12/1993 | Mason et al. |
| 5,275,891 | A | 1/1994 | Patel |
| 5,551,013 | A | 8/1996 | Beausoleil et al. |
| 5,574,873 | A | 11/1996 | Davidian |
| 5,790,825 | A | 8/1998 | Traut |
| 6,009,261 | A | 12/1999 | Scalzi et al. |
| 6,085,313 | A | 6/2000 | Check et al. |
| 6,266,769 | B1 | 7/2001 | Abdallah et al. |
| 6,308,255 | B1 | 10/2001 | Gorishek, IV et al. |
| 6,463,582 | B1 | 10/2002 | Lethin et al. |
| 6,671,796 | B1 | 12/2003 | Sudharsanan et al. |
| 7,167,968 | B2 | 1/2007 | Busaba et al. |
| 7,216,138 | B2 | 5/2007 | Abdallah et al. |
| 7,236,995 | B2 | 6/2007 | Hinds |
| 7,389,499 | B2 | 6/2008 | Donovan et al. |
| 7,733,785 | B2 | 6/2010 | Andreev et al. |
| 7,899,855 | B2 | 3/2011 | Ramanujam |
| 2007/0061387 | A1 | 3/2007 | Carlough et al. |
| 2007/0061388 | A1 | 3/2007 | Carlough et al. |
| 2007/0203965 | A1 | 8/2007 | Reynolds |
| 2008/0270496 | A1 | 10/2008 | Lundvall et al. |
| 2008/0270497 | A1* | 10/2008 | Lundvall ............... G06F 7/38 708/204 |
| 2008/0270506 | A1 | 10/2008 | Lundvall et al. |
| 2008/0270507 | A1 | 10/2008 | Lundvall et al. |
| 2008/0270509 | A1 | 10/2008 | Lundvall et al. |
| 2008/0270756 | A1 | 10/2008 | Lundvall et al. |
| 2009/0210467 | A1 | 8/2009 | Iorio |
| 2010/0095099 | A1 | 4/2010 | Boersma et al. |
| 2011/0004644 | A1 | 1/2011 | Henry et al. |
| 2011/0035745 | A1 | 2/2011 | Li et al. |
| 2011/0145308 | A1 | 6/2011 | Duale |
| 2011/0314263 | A1 | 12/2011 | Greiner et al. |
| 2013/0173891 | A1 | 7/2013 | Carlough et al. |
| 2013/0173892 | A1 | 7/2013 | Carlough et al. |

OTHER PUBLICATIONS

Extended European Search Report in Application No. 12863789.9 dated Nov. 8, 2016.
Office Action in U.S. Appl. No. 15/083,374, filed Oct. 3, 2017, 40 pgs.
"z/Architecture Principles of Operation," IBM® Publication No. SA22-7832-08, Ninth Edition, Aug. 2010, 1494 pages.
"Intel® 64 and IA-32 Architecture Software Developers Manual Volume 1," Order No. 253665-022US, Nov. 2006, 468 pages.
"Intel® 64 and IA-32 Architecture Software Developers Manual Volume 2A," Order No. 253666-022US, Nov. 2006, 744 pages.
"Intel® Itanium® Architecture Software Developers Manual Volume 1," Doc. No. 245317-005, Jan. 2006, 250 pages.
"Intel® Itanium® Architecture Software Developers Manual Volume 2," Doc. No. 245318-005, Jan. 2006, 653 pages.
"Intel® Itanium® Architecture Software Developers Manual vol. 3," Dog. No. 245319-005, Jan. 2006, 986 pages.
"IEEE Standard for Floating Point Arithmetic," IEEE Computer Society, Aug. 2008, pp. 1-70.
International Search Report and Written Opinion for PT/IB2012/56368 dated Mar. 26, 2013, pp. 1-8.
International Search Report and Written Opinion for PT/IB2012/56369 dated Mar. 26, 2013, pp. 1-8.
Office Action in U.S. Appl. No. 14/560,639, dated Feb. 18, 2015, pp. 1-22.
Office Action in U.S. Appl. No. 13/339,791, dated Feb. 6, 2015, pp. 1-25.
Office Action in U.S. Appl. No. 14/560,158, dated Feb. 5, 2015, pp. 1-23.
"ATOF—convert ASCII string to Floating Point", http://www.thinkage.ca/english/gcos/expl/c/lib/atof.html, accessed Sep. 25, 2006 1 page.
Final Office Action in U.S. Appl. No. 14/560,639, dated Jun. 4, 2015, pp. 1-16.
Final Office Action in U.S. Appl. No. 13/339,791, dated Jun. 3, 2015, pp. 1-16.
Final Office Action in U.S. Appl. No. 14/560,158, dated Jun. 4, 2015, pp. 1-15.
Office Action in U.S. Appl. No. 13/339,526, dated Feb. 5, 2015, pp. 1-24.
Final Office Action in U.S. Appl. No. 13/339,526, dated Jun. 3, 2015, pp. 1-13.
Notice of Allowance in U.S. Appl. No. 13/339,526, dated Feb. 8, 2016, pp. 1-11.
Notice of Allowance in U.S. Appl. No. 13/339,791, dated Feb. 18, 2016, pp. 1-15.
Notice of Allowance in U.S. Appl. No. 14/560,158, dated Feb. 18, 2016, pp. 1-15.
SimoTime, "Zoned Decimal Format", http://www.simotime.com/datazd01.htm, accessed Aug. 27, 2007, 5 pages.
"SPRINTF—formatted output to a string", http://www.thinkage.ca/english/gcos/expl/c/lib/sprint.html, accessed Oct. 1, 2005, 1 page.
Microchip, AN670, "Floating Point to ASCII Conversion", Sep. 11, 2001, 8 pages.
Jon Stokes, "RISC vs. CISC: the Post-RIS Era: A historical approach to the debate", http://arstechnica.com/features/1999/10/rvc, accessed Oct. 1, 1999, 7 pages.
Joseph A. Fisher, "Customized instruction-sets for embedded processors", Proceedings of the 36th annual ACM/IEEE Design Automation Conference, pp. 253-257, Jun. 21-25, 1999.
David Woolbright, "Base Displacement Addressing", http://csc.columbusstate.edu/woolbright/instruct.htm, accessed Sep. 21, 2001, 4 pages.
Office Action in U.S. Appl. No. 15/082,694 dated Nov. 29, 2016, 62 pgs.
Office Action in U.S. Appl. No. 15/082,775 dated Jan. 17, 2018, 45 pgs.
Tsuyoshi Kamenoue, "Technology innovation of POWER7 processor and it's ability", ASCII.technologies, ASCII Media Works Inc., Jul. 24, 2010, vol. 15, No. 9, p. 62-73; and Statement of Relevance co-filed herewith.
Munehiro Doi, "Advanced function of Power and performance", ASCII.technologies, ASCII Media Works Inc., Aug. 1, 2009, vol. 14, No. 8, p. 62-73; and Statement of Relevance co-filed herewith.
Final Office Action in U.S. Appl. No. 15/082,694 dated Apr. 25, 2018, 20 pgs.
Office Action in U.S. Appl. No. 15/083,374 dated May 14, 2018, 27 pgs.
Final Office Action in U.S. Appl. No. 15/082,775 dated Nov. 28, 2018, 11 pgs.
Final Office Action in U.S. Appl. No. 15/083,374 dated Nov. 27, 2018, 14 pgs.
Notice of Allowance in U.S. Appl. No. 15/082,775 dated Jan. 2, 2019, 13 pgs.
Notice of Allowance in U.S. Appl. No. 15/083,374 dated Jan. 4, 2019, 13 pgs.
Office Action in U.S. Appl. No. 15/082,775 dated Aug. 8, 2018, 26 pgs.
Final Office Action in U.S. Appl. No. 15/082,694 dated Feb. 4, 2019, 19 pgs.
Examination Report for Application No. 12863789.9 dated Jun. 27, 2019, 6 pgs.

\* cited by examiner

US 10,725,780 B2

CONVERT TO ZONED FORMAT FROM DECIMAL FLOATING POINT FORMAT

CROSS-REFERENCE TO RELATED APPLICATIONS

This application is a continuation of co-pending U.S. patent application Ser. No. 14/560,639, filed Dec. 4, 2014, entitled "CONVERT TO ZONED FORMAT FROM DECIMAL FLOATING POINT FORMAT", which is a continuation of Ser. No. 13/339,526, filed Dec. 29, 2011, entitled "CONVERT TO ZONED FORMAT FROM DECIMAL FLOATING POINT FORMAT", both of which are hereby incorporated herein by reference in their entirety.

BACKGROUND

An aspect of the present invention relates, in general, to processing within a computing environment, and in particular, to converting data from one format to another format.

Data may be stored in internal computer storage or external storage in a number of different formats, including in Extended Binary Coded Decimal Interchange (EBCDIC), American Standard for Information Interchange (ASCII), and decimal floating point, among others.

Different computer architectures support different data formats and may wish to perform operations on a particular format. In such a case, the data, which is in one format, may need to be converted to the desired format.

Further, traditionally, operations used to process numerical decimal data stored in EBCDIC or ASCII formats in databases operate directly on storage. These operations, referred to as storage-to-storage decimal operations, and the performance of these operations are limited by the latency of the memory interface. Each operation that is dependent on the results from a prior operation must wait until the results are written out to storage before it may begin. As the gap between memory latency and processor speed continues to increase, the relative performance of these operations continues to decrease.

SUMMARY

Shortcomings of the prior art are overcome and advantages are provided through the provision of a method of executing a machine instruction in a central processing unit. The method includes, for instance, obtaining, by a processor, a machine instruction for execution, the machine instruction being defined for computer execution according to a computer architecture, the machine instruction including: at least one opcode field to provide an opcode, the opcode identifying a convert to zoned from decimal floating point function; a first register field designating a first register, the first register comprising a first operand; a second register field and a displacement field, wherein contents of a second register designated by the second register field are combined with contents of the displacement field to form an address of a second operand; and a mask field, the mask field including one or more controls used during execution of the machine instruction; and executing the machine instruction, the executing including: converting at least a portion of the first operand in a decimal floating point format to a zoned format; and placing a result of the converting at a location designated by the address of the second operand.

Computer program products and systems relating to one or more aspects of the present invention are also described and may be claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and objects, features, and advantages of the invention are apparent from the following detailed description taken in conjunction with the accompanying drawings in which:

DETAILED DESCRIPTION

Different computer architectures may support different data formats, and the data formats supported may change over time. For instance, machines offered by International Business Machines Corporation have traditionally supported EBCDIC and ASCII formats. Later machines began supporting decimal floating point (DFP) formats and operations for which there is an IEEE Standard (IEEE 754-2008). However, to use the DFP operations, the EBCDIC and ASCII data is to be converted to DFP.

In accordance with an aspect of the present invention, an efficient mechanism to convert between EBCDIC or ASCII and decimal floating point is provided. In one example, this mechanism performs the conversion without the memory overhead of other techniques.

In one aspect of the present invention, machine instructions are provided that read EBCDIC or ASCII data (which have a zoned format) from memory, convert it to the appropriate decimal floating point format, and write it to a target floating point register or floating point register pair. These instructions are referred to herein as a long Convert from Zoned instruction (CDZT) and an extended Convert from Zoned instruction (CXZT).

In a further aspect of the present invention, machine instructions are provided that convert a decimal floating point (DFP) operand in a source floating point register or floating point register pair to EBCDIC or ASCII data, and store it to a target memory location. These instructions are referred to herein as a long Convert to Zoned instruction (CZDT) and an extended Convert to Zoned instruction (CZXT).

Figure 1:
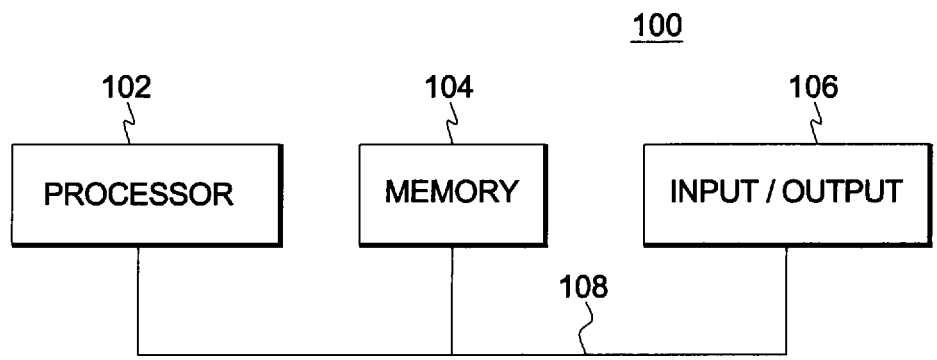
FIG. 1 depicts one embodiment of a computing environment to incorporate and use one or more aspects of the present invention.

One embodiment of a computing environment to incorporate and use one or more aspects of the present invention is described with reference to FIG. 1. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one example, processor 102 is a z/Architecture® processor which is part of a System Z® server offered by International Business Machines Corporation (IBM®), Armonk, N.Y. The System Z® server implements the z/Architecture®, offered by International Business Machines Corporation, which specifies the logical structure and functional operation of the computer. One embodiment of the z/Architecture® is described in an IBM® publication entitled, "z/Architecture Principles of Operation," IBM® Publication No. SA22-7832-08, Ninth Edition, August, 2010, which is hereby incorporated herein by reference in its entirety. In one example the server executes an operating system, such as z/OS®, also offered by International Business Machines Corporation. IBM®, z/Architecture® and z/OS® are registered trademarks of International Business Machines Corporation, Armonk, N.Y., USA. Other names used herein may be registered trademarks, trademarks, or product names of International Business Machines Corporation or other companies.

Figure 2A:
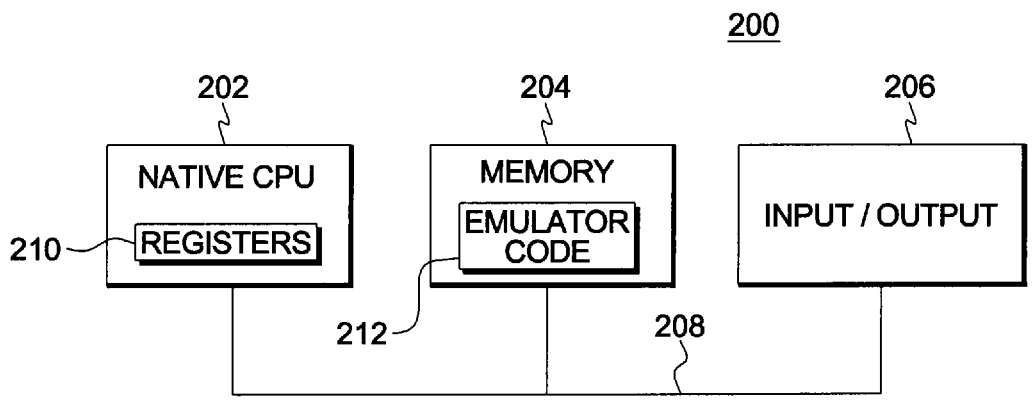
FIG. 2A depicts another embodiment of a computing environment to incorporate and use one or more aspects of the present invention.

Another embodiment of a computing environment to incorporate and use one or more aspects of the present invention is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC® processor, a pSeries® server or an xSeries® server offered by International Business Machines Corporation, Armonk, N.Y.; an HP Superdome with Intel Itanium II® processors offered by Hewlett Packard Co., Palo Alto, Calif.; and/or other machines based on architectures offered by IBM®, Hewlett Packard, Intel, Sun Microsystems or others. PowerPC®, pSeries® and xSeries® are registered trademarks of International Business Machines Corporation, Armonk, N.Y., USA. Intel® and Itanium II® are registered trademarks of Intel Corporation, Santa Clara, Calif.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the z/Architecture®, such as PowerPC® processors, pSeries® servers, xSeries® servers, HP Superdome servers or others, to emulate the z/Architecture® and to execute software and instructions developed based on the z/Architecture®.

Figure 2B:
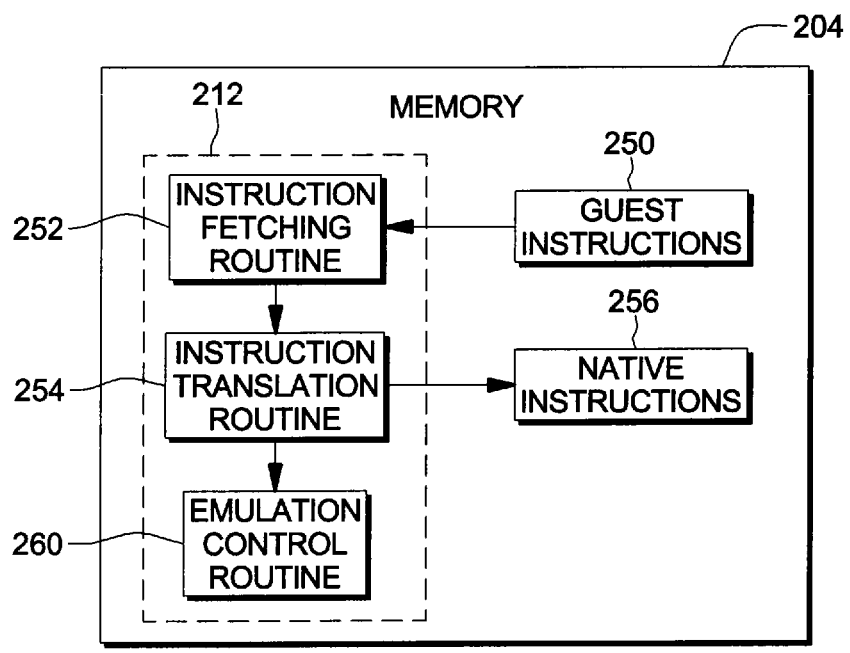
FIG. 2B depicts further details of the memory of FIG. 2A, in accordance with an aspect of the present invention.

Further details relating to emulator code 212 are described with reference to FIG. 2B. Guest instructions 250 comprise software instructions (e.g., machine instructions) that were developed to be executed in an architecture other than that of native CPU 202. For example, guest instructions 250 may have been designed to execute on a z/Architecture® processor 102, but instead are being emulated on native CPU 202 (which may be, for example, an Intel® Itanium II® processor). In one example, emulator code 212 includes an instruction fetching unit 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction to perform that function.

Further, emulator 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 250 may include loading data into a register from memory 204; storing data back to memory from a register; or performing some type of arithmetic or logic operation, as determined by the translation routine.

Each routine is, for instance, implemented in software, which is stored in memory and executed by the native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, the guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is one of the instructions described herein. The instruction, which is a z/Architecture® instruction in this example, is fetched from memory, translated and represented as a sequence of native instructions 256 (e.g., PowerPC®, pSeries®, xSeries®, Intel®, etc.) which are executed.

In another embodiment, one or more of the instructions are executed in another architecture environment, including, for example, an architecture as described in the "Intel® 64 and IA-32 Architectures Software Developer's Manual Volume 1," Order No. 253665-022US, November 2006; "Intel® 64 and IA-32 Architecture Software Developer's Manual Volume 2A," Order No. 253666-022US, November 2006; the "Intel® Itanium® Architecture Software Developer's Manual Volume 1," Doc. No. 245317-005, January 2006; the "Intel® Itanium® Architecture Software Developer's Manual Volume 2," Doc. No. 245318-005, January 2006; and/or the "Intel® Itanium® Architecture Software Developer's Manual Volume 3," Doc. No. 245319-005, January 2006; each of which is hereby incorporated herein by reference in its entirety.

The processors described herein, as well as others, execute instructions to perform certain functions, such as, for example, converting between EBCDIC or ASCII and decimal floating point formats. In one example, the EBCDIC or ASCII data has a zoned format, and therefore, example instructions include, for instance, convert from zoned to decimal floating point instructions, as well as convert to zoned from decimal floating point instructions, as described herein.

Prior to describing the instructions, however, various data formats referred to herein are described. For instance, in the zoned format, the rightmost four bits of a byte are called the numeric bits (N) and normally include a code representing a decimal digit. The leftmost four bits of a byte are called the zone bits (Z), except for the rightmost byte of a decimal operand, where these bits may be treated either as a zone or as a sign (S).

Decimal digits in the zoned format may be part of a larger character set, which includes also alphabetic and special characters. The zoned format is, therefore, suitable for input, editing, and output of numeric data in human-readable form. In one embodiment, decimal-arithmetic instructions do not operate directly on decimal numbers in the zoned format; such numbers are first converted to, for instance, one of the decimal floating point formats.

Decimal floating point data may be represented in any of three data formats: short, long, or extended. The contents of each data format represent encoded information. Special codes are assigned to distinguish finite numbers from NaNs (Not-a-Number) and infinites.

For finite numbers, a biased exponent is used in the format. For each format, a different bias is used for right-units-view (RUV) exponents from that for left-units-view (LUV) exponents. The biased exponents are unsigned numbers. The biased exponent is encoded with the leftmost digit (LMD) of the significand in the combination field. The remaining digits of the significand are encoded in the encoded trailing-significand field.

Examples of these data formats are:

DFP Short Format

| S | Combination | Encoded Trailing Significand |
|---|---|---|
| 0 | 1          12 | 31 |

When an operand in the DFP short format is loaded into a floating-point register, it occupies the left half of the register, and the right half remains unchanged.

DFP Long Format

| S | Combination | Encoded Trailing Significand |
|---|---|---|
| 0 | 1          14 | 31 |
| Encoded Trailing Significand (continued) |||
| 32 || 63 |

When an operand in the DFP long format is loaded into a floating-point register, it occupies the entire register.

DFP Extended Format

| S | Combination | Encoded Trailing Significand |
|---|---|---|
| 0 | 1          18 | 31 |
| Encoded Trailing Significand (continued) |||
| 32 || 63 |
| Encoded Trailing Significand (continued) |||
| 64 || 95 |
| Encoded Trailing Significand (continued) |||
| 96 || 127 |

An operand in the DFP extended format occupies a floating point register pair. The leftmost 64 bits occupy the entire lower-numbered register of the pair and the rightmost 64 bits occupy the entire higher-numbered register.

The sign bit is in bit 0 of each format, and is, for instance, zero for plus and one for minus.

For finite numbers, the combination field includes the biased exponent and the leftmost digit of the significand; for NaNs and infinities, this field includes codes to identify them.

When bits 1-5 of the format are in the range of 00000-11101, the operand is a finite number. The two leftmost bits of the biased exponent and the leftmost digit of the significand are encoded in bits 1-5 of the format. Bit 6 through the end of the combination field include the rest of the biased exponent.

When bits 1-5 of the format field are 11110, the operand is an infinity. All bits in the combination field to the right of bit 5 of the format constitute the reserved field for infinity. A nonzero value in the reserved field is accepted in a source infinity; the reserved field is set to zero in a resultant infinity.

When bits 1-5 of the format are 11111, the operand is a NaN and bit 6, called the SNaN bit, further distinguishes QNaN from SNaN. If bit 6 is zero, then it is QNaN; otherwise, it is SNaN. All bits in the combination field to the right of bit 6 of the format constitute the reserved field for NaN. A nonzero value in the reserved field is accepted in a source NaN; the reserved field is set to zero in a resultant NaN.

The below table summarizes the encoding and layout of the combination field. In the table, the biased exponent of a finite number is the concatenation of two parts: (1) two leftmost bits are derived from bits 1-5 of the format, and (2) the remaining bits in the combination field. For example, if the combination field of the DFP short format contains 10101010101 binary, it represents a biased exponent of 10010101 binary and a leftmost significand digit of 5.

| Bits 1 2 3 4 5 | Bit 6 | Type | Biased Exponent | LMD |
|---|---|---|---|---|
| 00000 | m | Finite Number | 00ξRBE | 0 |
| 00001 | m | Finite Number | 00ξRBE | 1 |
| 00010 | m | Finite Number | 00ξRBE | 2 |
| 00011 | m | Finite Number | 00ξRBE | 3 |
| 00100 | m | Finite Number | 00ξRBE | 4 |
| 00101 | m | Finite Number | 00ξRBE | 5 |
| 00110 | m | Finite Number | 00ξRBE | 6 |
| 00111 | m | Finite Number | 00ξRBE | 7 |
| 01000 | m | Finite Number | 01ξRBE | 0 |
| 01001 | m | Finite Number | 01ξRBE | 1 |
| 01010 | m | Finite Number | 01ξRBE | 2 |
| 01011 | m | Finite Number | 01ξRBE | 3 |
| 01100 | m | Finite Number | 01ξRBE | 4 |
| 01101 | m | Finite Number | 01ξRBE | 5 |
| 01110 | m | Finite Number | 01ξRBE | 6 |
| 01111 | m | Finite Number | 01ξRBE | 7 |
| 10000 | m | Finite Number | 10ξRBE | 0 |
| 10001 | m | Finite Number | 10ξRBE | 1 |
| 10010 | m | Finite Number | 10ξRBE | 2 |
| 10011 | m | Finite Number | 10ξRBE | 3 |
| 10100 | m | Finite Number | 10ξRBE | 4 |
| 10101 | m | Finite Number | 10ξRBE | 5 |
| 10110 | m | Finite Number | 10ξRBE | 6 |
| 10111 | m | Finite Number | 10ξRBE | 7 |
| 11000 | m | Finite Number | 00ξRBE | 8 |
| 11001 | m | Finite Number | 00ξRBE | 9 |
| 11010 | m | Finite Number | 01ξRBE | 8 |
| 11011 | m | Finite Number | 01ξRBE | 9 |
| 11100 | m | Finite Number | 10ξRBE | 8 |
| 11101 | m | Finite Number | 10ξRBE | 9 |
| 11110 | r | Infinity[1] | — | — |
| 11111 | 0 | QNaN[2] | — | — |
| 11111 | 1 | SNaN[2] | — | — |

Explanation:
— Not applicable.
ξ Concatenation.
[1] All bits in the combination field to the right of bit 5 of the format constitute the reserved field for infinity.
[2] All bits in the combination field to the right of bit 6 of the format constitute the reserved field for NaN.
LMD Leftmost digit of the significand.
m Bit 6 is a part of the remaining biased exponent.
RBE Remaining Biased exponent. It includes all bits in the combination field to the right of bit 5 of the format.
r Bit 6 is a reserved bit for infinity.

The encoded trailing significand field includes an encoded decimal number, which represents digits in the trailing significand. The trailing significand includes all significand digits, except the leftmost digit. For infinities, nonzero trailing-significand digits are accepted in a source infinity; all trailing-significand digits in a resultant infinity are set to zeros, unless otherwise stated. For NaNs, this field includes diagnostic information called the payload.

The encoded trailing significand field is a multiple of 10-bit blocks called declets. The number of declets depends on the format. Each declet represents three decimal digits in a 10-bit value.

The values of finite numbers in the various formats are shown in the following table:

| | Value | |
|---|---|---|
| Format | Left-Units View | Right-Units View |
| Short | $!10^{e-95}\%(d_0.d_1d_2 \ldots d_6)$ | $!10^{e-101}\%(d_0d_1d_2 \ldots d_6)$ |
| Long | $!10^{e-383}\%(d_0.d_1d_2 \ldots d_{15})$ | $!10^{e-398}\%(d_0d_1d_2 \ldots d_{15})$ |
| Extended | $!10^{e-6143}\%(d_0.d_1d_2 \ldots d_{33})$ | $!10^{e-6176}\%(d_0d_1d_2 \ldots d_{33})$ |

Explanation:
$d_0.d_1d_2 \ldots d_{p-1}$ Significand in left-units view. The decimal point is to the immediate right of the leftmost digit and $d_i$ is a decimal digit, where 0 [ i [ (p-1) and p is the format precision.
$d_0d_1d_2 \ldots d_{p-1}$ Significand in right-units view. The decimal point is to the right of the rightmost digit and $d_i$ is a decimal digit, where 0 [ i [ (p-1) and p is the format precision.
e Biased exponent.

The term significand is used to mean, for instance, the following:
1. For finite numbers, the significand includes all trailing significand digits padded on the left with the leftmost digit of significand derived from the combination field.
2. For infinities and NaNs, the significand contains all trailing significand digits padded on the left with a zero digit.

For a finite number, the DFP significant digits begin with the leftmost nonzero significand digit and end with the rightmost significand digit.

For a finite number, the number of DFP significant digits is the difference of subtracting the number of leading zeros from the format precision. The number of leading zeros is the number of zeros in the significand to the left of the leftmost nonzero digit.

In addition to the above, there is a densely packed decimal (DPD) format. Examples of a mapping of a 3-digit decimal number (000-999) to a 10-bit value, called a declet is shown in the table below. The DPD entries are shown in hexadecimal. The first two digits of the decimal number are shown in the leftmost column and the third digit along the top row.

| | 0 | 1 | 2 | 3 | 4 | 5 | 6 | 7 | 8 | 9 |
|---|---|---|---|---|---|---|---|---|---|---|
| 00_ | 000 | 001 | 002 | 003 | 004 | 005 | 006 | 007 | 008 | 009 |
| 01_ | 010 | 011 | 012 | 013 | 014 | 015 | 016 | 017 | 018 | 019 |
| 02_ | 020 | 021 | 022 | 023 | 024 | 025 | 026 | 027 | 028 | 029 |
| 03_ | 030 | 031 | 032 | 033 | 034 | 035 | 036 | 037 | 038 | 039 |
| 04_ | 040 | 041 | 042 | 043 | 044 | 045 | 046 | 047 | 048 | 049 |
| 05_ | 050 | 051 | 052 | 053 | 054 | 055 | 056 | 057 | 058 | 059 |
| 06_ | 060 | 061 | 062 | 063 | 064 | 065 | 066 | 067 | 068 | 069 |
| 07_ | 070 | 071 | 072 | 073 | 074 | 075 | 076 | 077 | 078 | 079 |
| 08_ | 00A | 00B | 02A | 02B | 04A | 04B | 06A | 06B | 04E | 04F |
| 09_ | 01A | 01B | 03A | 03B | 05A | 05B | 07A | 07B | 05E | 05F |
| 10_ | 080 | 081 | 082 | 083 | 084 | 085 | 086 | 087 | 088 | 089 |
| | | | | * | | | | | | |
| | | | | * | | | | | | |
| | | | | * | | | | | | |
| 90_ | 08C | 08D | 18C | 18D | 28C | 28D | 38C | 38D | 0AE | 0AF |
| 91_ | 09C | 09D | 19C | 19D | 29C | 29D | 39C | 39D | 0BE | 0BF |

-continued

|     | 0   | 1   | 2   | 3   | 4   | 5   | 6   | 7   | 8   | 9   |
|-----|-----|-----|-----|-----|-----|-----|-----|-----|-----|-----|
| 92_ | 0AC | 0AD | 1AC | 1AD | 2AC | 2AD | 3AC | 3AD | 1AE | 1AF |
| 93_ | 0BC | 0BD | 1BC | 1BD | 2BC | 2BD | 3BC | 3BD | 1BE | 1BF |
| 94_ | 0CC | 0CD | 1CC | 1CD | 2CD | 2CD | 3CC | 3CD | 2AE | 2AF |
| 95_ | 0DC | 0DD | 1DC | 1DD | 2DC | 2DD | 3DC | 3DD | 2BE | 2BF |
| 96_ | 0EC | 0ED | 1EC | 1ED | 2EC | 2ED | 3EC | 3ED | 3AE | 3AF |
| 97_ | 0FC | 0FD | 1FC | 1FD | 2FC | 2FD | 3FC | 3FD | 3BE | 3BF |
| 98_ | 08E | 08F | 18E | 18F | 28E | 28F | 38E | 38F | 0EE | 0EF |
| 99_ | 09E | 09F | 19E | 19F | 29E | 29F | 39E | 39F | 0FE | 0FF |

Examples of the mapping of the 10-bit declet to a 3-digit decimal number is shown in the table below. The 10-bit declet value is split into a 6-bit index shown in the left column and a 4-bit index shown along the top row, both represented in hexadecimal.

|     | 0   | 1   | 2   | 3   | 4   | 5   | 6   | 7   | 8   | 9   | A   | B   | C   | D   | E    | F    |
|-----|-----|-----|-----|-----|-----|-----|-----|-----|-----|-----|-----|-----|-----|-----|------|------|
| 00_ | 000 | 001 | 002 | 003 | 004 | 005 | 006 | 007 | 008 | 009 | 080 | 081 | 800 | 801 | 880  | 881  |
| 01_ | 010 | 011 | 012 | 013 | 014 | 015 | 016 | 017 | 018 | 019 | 090 | 091 | 810 | 811 | 890  | 891  |
| 02_ | 020 | 021 | 022 | 023 | 024 | 025 | 026 | 027 | 028 | 029 | 082 | 083 | 820 | 821 | 808  | 809  |
| 03_ | 030 | 031 | 032 | 033 | 034 | 035 | 036 | 037 | 038 | 039 | 092 | 093 | 830 | 831 | 818  | 819  |
| 04_ | 040 | 041 | 042 | 043 | 044 | 045 | 046 | 047 | 048 | 049 | 084 | 085 | 840 | 841 | 088  | 089  |
| 05_ | 050 | 051 | 052 | 053 | 054 | 055 | 056 | 057 | 058 | 059 | 094 | 095 | 850 | 851 | 098  | 099  |
| 06_ | 060 | 061 | 062 | 063 | 064 | 065 | 066 | 067 | 068 | 069 | 086 | 087 | 860 | 861 | 888  | 889  |
| 07_ | 070 | 071 | 072 | 073 | 074 | 075 | 076 | 077 | 078 | 079 | 096 | 097 | 870 | 871 | 898  | 899  |
| 08_ | 100 | 101 | 102 | 103 | 104 | 105 | 106 | 107 | 108 | 109 | 180 | 181 | 900 | 901 | 980  | 981  |
| 09_ | 110 | 111 | 112 | 113 | 114 | 115 | 116 | 117 | 118 | 119 | 190 | 191 | 910 | 911 | 990  | 991  |
| 0A_ | 120 | 121 | 122 | 123 | 124 | 125 | 126 | 127 | 128 | 129 | 182 | 183 | 920 | 921 | 908  | 909  |
|     |     |     |     |     |     | *   |     |     |     |     |     |     |     |     |      |      |
|     |     |     |     |     |     | *   |     |     |     |     |     |     |     |     |      |      |
|     |     |     |     |     |     | *   |     |     |     |     |     |     |     |     |      |      |
| 37_ | 670 | 671 | 672 | 673 | 674 | 675 | 676 | 677 | 678 | 679 | 696 | 697 | 876 | 877 | 898* | 899* |
| 38_ | 700 | 701 | 702 | 703 | 704 | 705 | 706 | 707 | 708 | 709 | 780 | 781 | 906 | 907 | 986  | 987  |
| 39_ | 710 | 711 | 712 | 713 | 714 | 715 | 716 | 717 | 718 | 719 | 790 | 791 | 916 | 917 | 996  | 997  |
| 3A_ | 720 | 721 | 722 | 723 | 724 | 725 | 726 | 727 | 728 | 729 | 782 | 783 | 926 | 927 | 968  | 969  |
| 3B_ | 730 | 731 | 732 | 733 | 734 | 735 | 736 | 737 | 738 | 739 | 792 | 793 | 936 | 937 | 978  | 979  |
| 3C_ | 740 | 741 | 742 | 743 | 744 | 745 | 746 | 747 | 748 | 749 | 784 | 785 | 946 | 947 | 788  | 789  |
| 3D_ | 750 | 751 | 752 | 753 | 754 | 755 | 756 | 757 | 758 | 759 | 794 | 795 | 956 | 957 | 798  | 799  |
| 3E_ | 760 | 761 | 762 | 763 | 764 | 765 | 766 | 767 | 768 | 768 | 786 | 787 | 966 | 967 | 988* | 989* |
| 3F_ | 770 | 771 | 772 | 773 | 774 | 775 | 776 | 777 | 778 | 779 | 796 | 797 | 976 | 977 | 998* | 999* |

*Result mapped from a noncanonical declet.

In accordance with an aspect of the present invention, instructions are provided to convert from zoned format to decimal floating point. In one embodiment, there are two types of convert from zoned to decimal floating point instructions, including a long Convert from Zoned instruction (CDZT), and an extended Convert from Zoned instruction (CXZT), each of which is described below. These instructions provide an efficient means for converting data from EBCDIC or ASCII directly in memory to the decimal floating point formats in a register.

Figure 3:
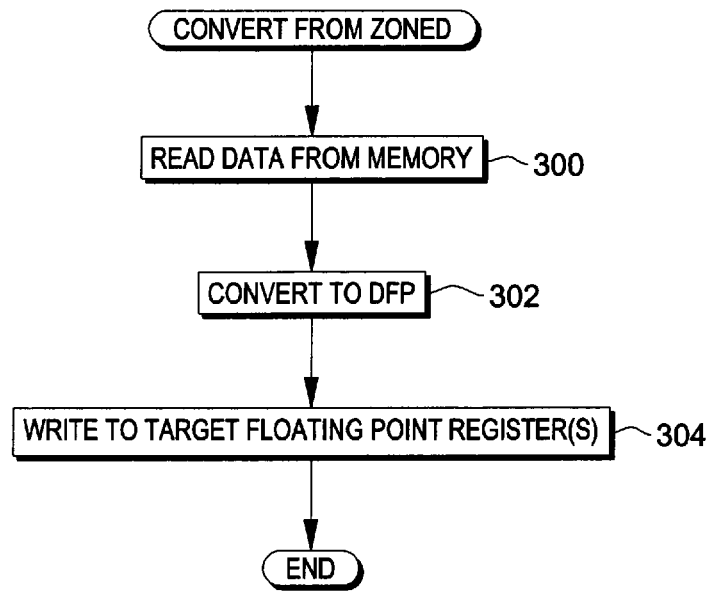
FIG. 3 depicts an overview of the logic to convert from a zoned format to a decimal floating point format, in accordance with an aspect of the present invention.

For instance, referring to FIG. 3, in one embodiment, each machine instruction reads EBCDIC or ASCII data from memory, STEP 300; converts it to the appropriate decimal floating point format, STEP 302; and writes it to a target floating point register or floating point register pair, STEP 304.

The long Convert from Zoned instruction, CDZT, reads the operand data from a specified memory location, converts it to a double precision DFP operand with a zero exponent, and writes it to the specified target floating point register. The extended Convert from Zoned instruction, CXZT, reads the operand data from a specified memory location, converts it to an extended precision DFP operation with a zero exponent, and writes it to the specified target floating point register pair. The number of bytes in the source memory location is specified in an instruction and can be from 1 to 16 bytes for CDZT or from 1 to 34 bytes for CXZT. The digits of the source operand are all checked for valid digit codes. A sign field in the instruction indicates that the sign nibble of the source operand is to be processed. If the sign field is set, the sign is checked for a valid sign code. Assuming it is valid, the sign of the DFP result is set to the same sign as indicated by the sign nibble of the source operand. If an invalid digit or sign code is detected, a decimal data exception is recognized.

Figure 4:
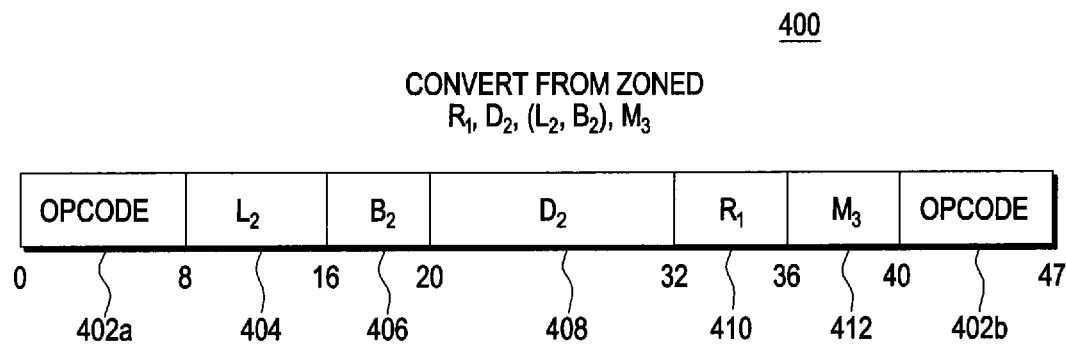
FIG. 4 depicts one embodiment of a format of a Convert from Zoned instruction used in accordance with an aspect of the present invention.

In one embodiment, each of the Convert from Zoned instructions has a same format (an RSL-b format), an example of which is depicted in FIG. 4. As depicted in one embodiment, a format 400 of the Convert from Zoned instruction includes, for instance, the following fields:

Opcode fields 402a, 402b: The opcode fields provide an opcode that indicates the function being performed by the instruction. As examples, one defined opcode defines the function as the long Convert from Zoned instruction, and another predefined opcode indicates it is an extended Convert from Zoned instruction.

Length field ($L_2$) 404: Length field 404 specifies the length (e.g., in bytes) of the second operand. As examples, the length field includes a length code of 0 to 33 for an extended Convert to Zoned instruction, and a length code of 0 to 15 for a long Convert from Zoned instruction.

Base register field ($B_2$) 406: The base register field designates a general register, the contents of which are added to the contents of the displacement field to form the second operand address.

Displacement field ($D_2$) 408: The displacement field includes contents that are added to the contents of the general register designated by the base register field to form the second operand address.

Register field ($R_1$) 410: The register field designates a register, the contents of which are the first operand. The register including the first operand is sometimes referred to as the first operand location.

Mask field ($M_3$) 412: The mask field includes, for instance, a sign (S) control (e.g., bit), which in one example is bit 0 of the $M_3$ field. When this bit is zero, the second operand does not have a sign field and the sign bit of the DFP first operand result is set to 0. When one, the second operand is signed. That is, the leftmost four bits of the rightmost byte are a sign. The sign bit of the DFP first operand result is set to zero, when the sign field indicates a positive value; and one, when the sign field indicates a negative value. In one embodiment, bits 1 to 3 of the $M_3$ field are ignored.

During operation of the Convert from Zoned instruction, the second operand in the zoned format is converted to the DFP format, and the result is placed at the first operand location. In one example, the quantum is one and the delivered value is represented with the quantum. The result placed at the first operand location is canonical.

In one embodiment, when an invalid digit or sign code is detected in the second operand, a decimal operand data exception is recognized. A specification exception is recognized and the operation is suppressed when, for instance, any of the following is true: For CDZT, the $L_2$ field is greater than or equal to 16; and for CXZT, the $R_1$ field designates an invalid floating point register pair, or the $L_2$ field is greater than or equal to 34.

In one embodiment, when an ASCII second operand is specified, bit 0 of the $M_3$ field is 0; otherwise a decimal operand data exception is recognized. That is, a sign value of 0011 binary is not a valid sign.

Figure 5:
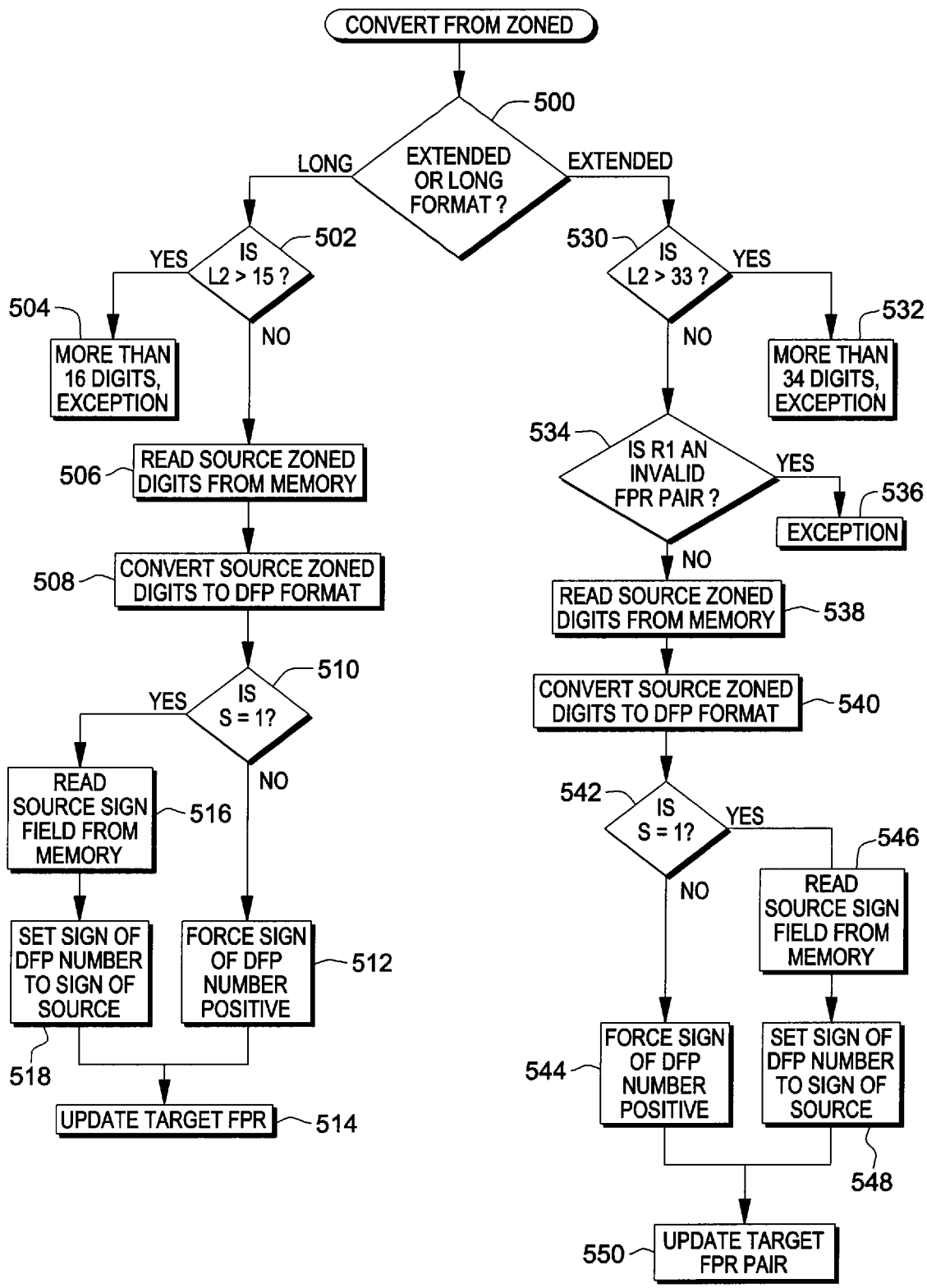
FIG. 5 depicts further details of the logic to convert from zoned to decimal floating point, in accordance with an aspect of the present invention.

Further details regarding execution of a Convert from Zoned instruction are described with reference to FIG. 5. In one example, it is the processor that executes the Convert from Zoned instruction that performs this logic.

Initially, a determination is made as to whether the opcode of the Convert from Zoned instruction indicates it is the extended or long format, INQUIRY 500. That is, is the instruction being executed the long Convert from Zoned instruction or the extended Convert from Zoned instruction. If the opcode indicates that it is the long Convert from Zoned instruction, then a further determination is made as to whether the length field ($L_2$) provided in the instruction specifies a length greater than 15, INQUIRY 502. If the length field specifies a length greater than 15, then an exception is provided indicating that it is more than 16 digits (0 to 15), STEP 504.

Returning to INQUIRY 502, if the length field does not specify a length greater than 15, then the source zoned digits (at least a portion of the second operand) are read from memory, STEP 506. Thereafter, the source zoned digits read from memory are converted to a decimal floating point format, STEP 508. In this example, it is converted to a double precision DFP operand with a zero exponent.

Additionally, a determination is made as to whether the sign control (S) designated in the mask field ($M_3$) is set to 1, INQUIRY 510. If the sign control is not equal to one, then the sign of the DFP number is forced positive, STEP 512, and the target floating point register is updated with the converted value, including the forced sign, STEP 514.

Returning to INQUIRY 510, if the sign control is equal to 1, then the source sign field (of the second operand) is read from memory, STEP 516. Thereafter, the sign of the DFP number is set to the sign of the source, STEP 518, and the target floating point register is updated with the converted value and the sign (e.g., bit 0 of the DFP format), STEP 514.

Returning to INQUIRY 500, if the opcode indicates that it is an extended Convert from Zoned instruction, then a determination is made as to whether the length field of the instruction specifies a length greater than 33, INQUIRY 530. If the length field specifies length greater than 33, then an exception is provided indicating more than 34 digits (0 to 33), STEP 532. However, if the length field does not specify a length greater than 33, then a determination is made as to whether the $R_1$ field of the instruction specifies an invalid floating point register pair, INQUIRY 534. If an invalid floating point register pair is indicated, then an exception is provided, STEP 536. Otherwise, the source zoned digits (at least a portion of the second operand) are read from memory, STEP 538. Thereafter, the source zoned digits read from memory are converted to a decimal floating point format, STEP 540. In this example, the digits (at least a portion of the second operand) are converted to an extended precision data floating point operation with a zero exponent.

Thereafter, a determination is made as to whether the sign (S) control in the mask field of the instruction is set to one, INQUIRY 542. If the sign control is not equal to 1, then the sign of the data floating point number is forced to positive, STEP 544. However, if the sign control is equal to 1, then the source sign field (of the second operand) is read from memory, STEP 546, and the sign of the DFP number is set to the sign of the source, STEP 548. Subsequent to setting the sign either in STEP 544 or STEP 548, the target floating point register pair is updated with the converted decimal floating point format and the sign, STEP 550.

Referenced above are two steps for converting source zoned digits read from memory to a decimal floating point format. In particular, STEP 508 converts the source to a double precision decimal floating point operand with a zero exponent, and STEP 540 converts the source to an extended precision data floating point operation with a zero exponent. Further details regarding the conversions are described below, as well as in the above-referenced "z/Architecture Principles of Operation," IBM® Publication No. SA22-7832-08, Ninth Edition, August, 2010, which is hereby incorporated herein by reference in its entirety.

One embodiment of the process of converting from a Zoned formatted number to the DFP format is as follows: The source digits are read from memory. The Binary Coded Decimal (BCD) digits in the right 4-bits of each byte of source data is padded on the left with zero's, if necessary, such that a total of 16 BCD digits exist for a double precision operation, and such that 34 digits exist for an extended precision operation. These BCD digits are then converted from BCD to Densely Packed Decimal (DPD) such that every 3 BCD digits starting on the right of the source data is converted to a 10-bit DPD group for all the BCD digits except the leftmost BCD digit. Thus, there exist 5 DPD groups for the double precision conversion and 11 DPD groups for the extended precision conversion. These DPD groups make up bits 14-63 of the double precision result and bits 17-127 of an extended precision result. Bits 6-13 are the exponent field of a double precision result and with 2 bits from the combo field in bits 1-5 are set to a value of 398 for double precision operations. For extended precision operations, bits 6-17 are exponent field bits and with 2 bits from the combo field are set to a value of 6176 for extended precision operations.

If the most significant BCD digit is "8" or "9", then bits 1 and 2 are set to '1'; bits 3 and 4 are the most significant 2 bits of the exponent and so would be set to "01"; and bit 5 is set to '0' for an "8" or '1' for a "9". If the most significant BCD digit is "0" to "7", then bits 1 and 2 are the most significant value of the exponent and so would be set to "01", and bits 3-5 are set to the rightmost 3 bits of the most significant BCD digit.

The leftmost 4 bits of the rightmost byte of source data is the sign code, if S=1. In this case the result sign bit, bit 0, is set to 1, if the value of the sign code is "1011" or "1101".

Described in detail above are two instructions that provide a means to significantly improve traditional storage-to-storage decimal workload. In the traditional storage-to-storage decimal workloads, the EBCDIC or ASCII operands are first converted to a packed decimal format, which strips out the field codes and puts the numeric digits and sign digits of two operands in another part of storage. The packed operands are then operated on by an arithmetic operation, such as add, subtract, multiply or divide. These arithmetic operations must wait for the stores of the pack process to complete before they can begin, and these operations then store their results to memory. Once the result store is complete, the result is then unpacked back to the target format (EBCDIC or ASCII). The memory dependencies from the operations dominate the performance.

In accordance with an aspect of the present invention, employing the new instructions (e.g., recompiling the code with the new instructions enabled) replaces the Pack or PKA instruction with the CDZT or CXZT depending on the target format. The mathematical operation can then be replaced with its DFP equivalent (e.g., AD/XTR, SD/XTR, MD/XTR, DT/XTR) such that there is no wait for any operands to be stored or read from memory. These instructions operate in a similar amount of time as add (AP), subtract (SP), multiply (MP) or divide (DP), but without the memory overhead. The second memory dependency is avoided when the UNPK or UNPKA operation is replaced and the result is directly converted to the target format via CZDT or CZXT instructions described below.

Traditional storage-to-storage decimal pack operations are able to process 15 digits and a sign requiring 3 overlapping pack operations to process each 31-digit (and sign) operand typically found in applications, such as a COBOL applications. Having to break an operand into smaller overlapping mini-operands adds to the complexity of the compiler and the compiled code; requires additional instructions to be executed to perform a given task, such as handling carry/borrow between mini-operands; and impacts performance. Since CXZT is capable of converting 34 digits and a sign code into a DFP operand, compilers can treat the common 31-digit and sign operands (e.g., COBOL operands) as a single entity, simplifying the compiled code and improving performance.

As described herein, the CDZT and CXZT instructions provide an efficient means for converting data from EBCDIC or ASCII in memory directly to the DFP formats in register. They allow the data to be converted from EBCDIC or ASCII to the DFP format in a single step. Previously, the process required using Pack or PKA operations to convert the data to the packed decimal format. The data must then be loaded into general purpose registers (GPRs), but since there is no length-controlled load currently in the instruction set architecture, this often requires a mix of word, half-word and byte-load operations. Other instructions, CDSTR or CXSTR, can then be used to convert the packed decimal data in the GPR/GPR-pair to the target DFP format. In accordance with an aspect of the present invention, PACK/PKA and CDSTR/CXSTR are replaced by one instruction, CDZT or CXZT.

In addition to Convert from Zoned to decimal floating point instructions, in accordance with a further aspect of the present invention, Convert to Zoned from decimal floating point instructions are provided. These instructions provide an efficient means of converting data from the decimal floating point format held in a floating point register or floating point register pair to EBCDIC or ASCII data and storing it directly to memory.

Figure 6:
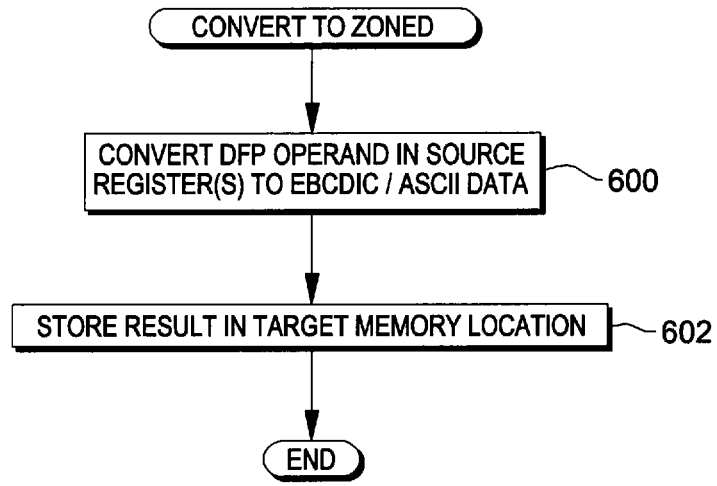
FIG. 6 depicts an overview of the logic to convert to a zoned format from a decimal floating point format, in accordance with an aspect of the present invention.

For instance, referring to FIG. 6, in one example, a DFP operand in a source register or source register pair is converted to EBCDIC or ASCII data, STEP 600. The converted result is then stored in a target memory location, STEP 602. These instructions allow the data to be converted from the DFP format directly to EBCDIC and ASCII in a single step.

Examples of these instructions include a long Convert to Zoned instruction (CZDT) and an extended Convert to Zoned instruction (CZXT). The long Convert to Zoned instruction, CZDT, reads the double precision DFP operand data from a specified FPR register, converts the mantissa to the zoned format, and writes it to the target memory location. Likewise, the extended Convert to Zoned instruction, CZXT, reads the extended precision DFP operand data from a specified FPR register pair, and converts the mantissa to a zoned format, and writes it to the target memory location. If the length of the memory location specified is not sufficient to fit all of the leftmost non-zero digits of the source operand, a decimal overflow exception is recognized, provided the decimal overflow mask is enabled. In the event not all the digits fit into the specified memory location, a specific condition code is set (e.g., 3). The sign of the DFP operand is copied to the sign nibble of the result in memory, if the sign field to set. The positive sign encoding used is controlled by the P field in the instruction text, described below, and the results of the zero operand can conditionally be forced positive by the Z field of the instruction text, also described below. This sort of sign manipulation is commonly required in compiler code and inclusion of this function directly into the instruction provides a performance savings and simplifies the compiler code.

Figure 7:
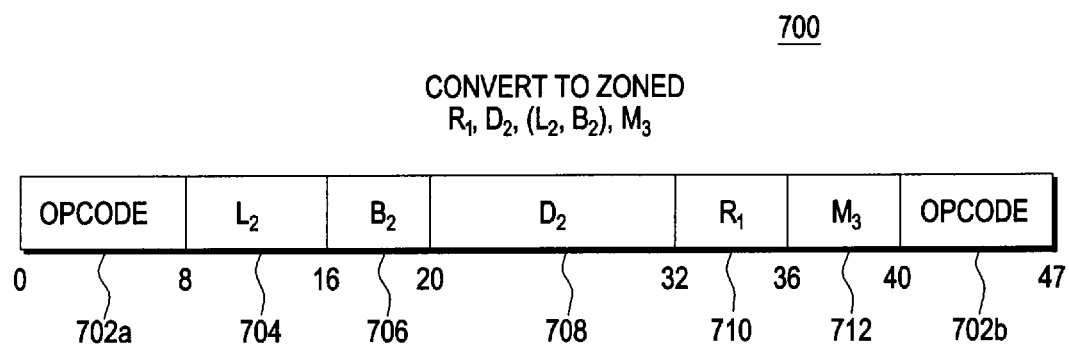
FIG. 7 depicts one embodiment of a Convert to Zoned from decimal floating point instruction used in accordance with an aspect of the present invention.

One embodiment of a format (RSL-b) of a Convert to Zoned instruction is described with reference to FIG. 7. In one example, a format 700 of the Convert to Zoned instruction includes the following fields:

Opcode fields 702a, 702b: The opcode fields provide an opcode that indicates the function being performed by the instruction. As examples, one defined opcode specifies the function as the long Convert to Zoned instruction, and another predefined opcode indicates it is an extended Convert to Zoned instruction.

Length field ($L_2$) 704: Length field 704 specifies the length (e.g., in bytes) of the second operand. As examples, the length field includes a length code of 0 to 33 for an extended Convert to Zoned instruction, and a length code of 0 to 15 for a long Convert to Zoned instruction. Further, the number of rightmost significand digits of the first operand to be converted is specified by $L_2$.

Base register field ($B_2$) 706: The base register field designates a general register, the contents of which are added to the contents of the displacement field to form the second operand address.

Displacement field ($D_2$) 708: The displacement field includes contents that are added to the contents of the general register designated by the base register field to form the second operand address.

Register field ($R_1$) 710: The register field designates a register, the contents of which are the first operand.

Mask field ($M_3$) 712: The mask field includes, for instance:

Sign Control (S): Bit 0 of the $M_3$ field is the sign control. When S is zero, the second operand does not have a sign field. When S is one, the second operand has a sign field. That is, the leftmost four bit positions of the rightmost byte are a sign.

Zone Control (Z): Bit 1 of the $M_3$ field is the zone control. When Z is zero, each zone field of the second operand is stored as 1111 binary. When Z is one, each zone field of the second operand is stored as 0011 binary.

Plus-Sign-Code Control (P): Bit 2 of the $M_3$ field is the plus-sign-code control. When P is zero, the plus sign is encoded as 1100 binary. When P is one, the plus sign is encoded as 1111 binary. When the S bit is zero, the P bit is ignored and assumed to be zero.

Force-Plus-Zero Control (F): Bit 3 of the $M_3$ field is the force-plus-zero control. When F is zero, no action is taken. When F is one and the absolute value of the result placed at the second operand location is zero, the sign of the result is set to indicate a plus value with the sign code specified by the P bit. When the S bit is zero, the F bit is ignored and assumed to be zero.

In operation, the specified number of rightmost significand digits of the DFP first operand and the sign bit of the first operand are converted to the zoned format, and the result is placed at the second operand location. A right-units view of the first operand with quantum of one is implied. The exponent in the combination field is ignored and treated as if it had a value of zero, before biasing.

The number of rightmost significand digits of the first operand to be converted is specified by $L_2$. The length in bytes of the second operand is 1-34 for CZXT, corresponding to a length code in $L_2$ of 0 to 33, meaning 1-34 digits. The length in bytes of the second operand is 1-16 for CZDT, corresponding to a length code in $L_2$ of 0 to 15, meaning 1 to 16 digits.

In one embodiment, the operation is performed for any first operand, including an infinity, QNaN, or SNaN, without causing an IEEE exception. If the first operand is infinity or a NaN, a zero digit is assumed to be the leftmost digit of the significand, the specified number of rightmost significand digits and the sign bit are converted to the zoned format, the result is placed at the second operand location, and execution completes with a specific condition code (e.g., 3).

When leftmost non-zero digits of the result are lost because the second operand field is too short, the result is obtained by ignoring the overflow digits, a specified condition code (e.g., of 3) is set, and if the decimal overflow mask bit is one, a program interruption of decimal overflow occurs. The operand lengths alone are not an indication of overflow; non-zero digits are to be lost during the operation.

A specification exception is recognized, and the operation is suppressed when, for instance, any of the following is true: for CZDT, the $L_2$ field is greater than or equal to 16, meaning 17 or more digits. For CZXT, the $R_1$ field designates an invalid floating point register pair, or the $L_2$ field is greater than or equal to 34, meaning 35 or more digits.

Examples of resulting condition codes include:

| | |
|---|---|
| 0 | Source is zero |
| 1 | Source is less than zero |
| 2 | Source is greater than zero |
| 3 | Infinity, QNan, SNaN, partial result. |

In one embodiment, an ASCII zoned decimal operand may be stored as signed when the S bit is one. This is up to the program as ASCII representations are usually unsigned and positive with no concept of a rightmost zone being used as a sign. Further, a completion with a particular condition code (e.g., 0) indicates that the absolute value of the first operand is zero.

Relationships among the $M_3$ control bits versus the first operand DFP sign and the absolute value of the resulting second operand being zero are illustrated in the below table, which is provided as one example:

| $M_3$ | | | | | | Result | |
|---|---|---|---|---|---|---|---|
| Zone Control (Z) | Sign Control (S) | Plus Sign-Code Control (P) | Force Plus-Zero Control (F) | $1^{st}$ Op Sign Bit | Absolute Value | Zone Value (Binary) | Sign Value (Binary) |
| 0 | 0 | x | x | x | x | 1111 | — |
|   | 1 | 0 | x | 0 | x |   | 1100 |
|   |   |   | 0 | 1 | x |   | 1101 |
|   |   |   | 1 | 1 | zero |   | 1100 |
|   |   |   | 1 | 1 | nonzero |   | 1101 |
|   |   | 1 | 0 | 0 | x |   | 1111 |
|   |   |   |   | 1 | x |   | 1101 |
|   |   |   | 1 | 0 | x |   | 1111 |
|   |   |   |   | 1 | zero |   | 1111 |
|   |   |   |   | 1 | nonzero |   | 1101 |
| 1 | 0 | x | x | x | x | 0011 | — |
|   | 1 | 0 | x | 0 | x |   | 1100 |
|   |   |   | 0 | 1 | x |   | 1101 |
|   |   |   | 1 | 1 | zero |   | 1100 |
|   |   |   | 1 | 1 | nonzero |   | 1101 |
|   |   | 1 | 0 | 0 | x |   | 1111 |
|   |   |   |   | 1 | x |   | 1101 |
|   |   |   | 1 | 0 | x |   | 1111 |
|   |   |   |   | 1 | zero |   | 1111 |
|   |   |   |   | 1 | nonzero |   | 1101 | x Ignored
— Not applicable

Further details regarding the logic of the Convert to Zoned instruction are described with reference to FIG. 8. In one example, this logic is performed by a processor executing a Convert to Zoned machine instruction.

Figure 8:
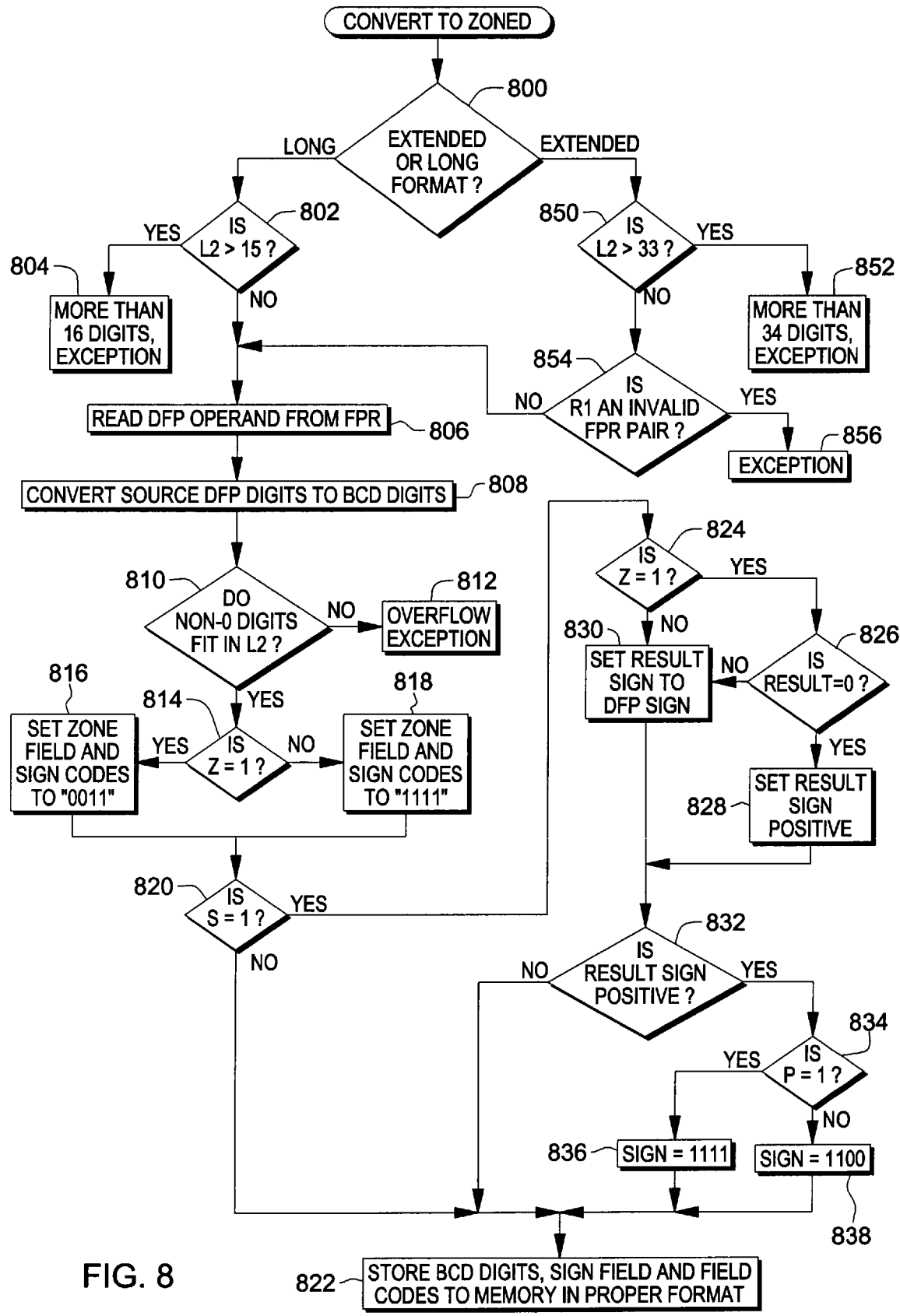
FIG. 8 depicts further details of the logic to convert to zoned from decimal floating point, in accordance with an aspect of the present invention.

Referring to FIG. 8, initially, a determination is made as to whether this is an extended Convert to Zoned instruction or a long Convert to Zoned instruction, as indicated by the opcode of the instruction, INQUIRY 800. If it is a long Convert to Zoned instruction, as indicated by the opcode, then a further determination is made as to whether the $L_2$ field specifies a length greater than 15, INQUIRY 802. If the $L_2$ field does specify a length greater than 15, then an exception is provided since there are more than 16 digits (0-15), STEP 804.

Returning to INQUIRY 802, if the length field does not specify a length greater than 15, then the DFP operand is read from the floating point register designated in the convert instruction (using $R_1$), STEP 806. The source DFP digits of the read DFP operand are then converted to BCD digits, STEP 808.

Subsequent to the conversion, a determination is made as whether non-zero digits fit in the length specified by $L_2$, INQUIRY 810. If non-zero digits do not fit, then an overflow exception is indicated, STEP 812. Otherwise, a further determination is made as to whether the Z bit of the mask field is equal to 1, INQUIRY 814. If Z is equal to 1, then the zone field and sign codes are set to "0011", STEP 816. Otherwise, the zone field and sign codes are set to "1111", STEP 818.

Subsequent to setting the zone field and sign codes, a further determination is made as to whether the S bit of the mask field is set to 1, INQUIRY 820. If the S bit is not set to 1, then the BCD digits, sign field and field codes are stored to memory in the proper format, STEP 822. One example of a zoned format is as follows:

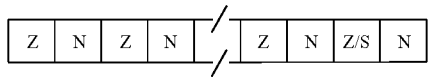

In this example, the rightmost four bits of a byte are called the numeric bits (N) and normally include a code representing a decimal digit. The leftmost four bits of a byte are called the zone bits (Z), except for the rightmost byte of a decimal operand, where these bits may be treated either as a zone or as a sign (S).

Returning to INQUIRY 820, if the S bit is equal to 1, then a further determination is made as to whether the Z bit in the mask is set to 1, INQUIRY 824. If Z is equal to 1, then a determination is made as to whether the result is equal to zero, STEP 826. If the result is equal to zero, then the result sign is set to positive, STEP 828. If the result is not set to equal to zero or Z is not equal to one, then the result sign is set to the DFP sign, STEP 830.

Subsequent to setting the result sign, a determination is made as to whether the result sign is positive, INQUIRY 832. If the result sign is not positive, then processing continues with STEP 822, storing the BCD digits, sign field and field codes to memory in the proper format. However, if the result sign is positive, INQUIRY 832, a further determination is made as to whether the P bit of the mask field is set to 1, INQUIRY 834. If the P bit is set to one, then the sign is set equal to 1111; otherwise, the sign is set equal to 1100, STEP 838. After setting the sign, processing continues with STEP 822.

Returning to INQUIRY 800, if this is an extended Convert to Zoned instruction, then a determination is made as to whether the length field specifies a length greater than 33, INQUIRY 850. If the length field specifies a length greater than 33, then an exception is specified indicating more than 34 digits, STEP 852. Otherwise, a determination is made as to whether the register field ($R_1$) specifies an invalid floating point register pair, INQUIRY 854. If not, then processing continues with STEP 806. Otherwise, an exception is provided, STEP 856. This completes the description of embodiments of the Convert to Zoned instruction.

Referenced above is a step for converting source DFP digits to BCD digits. Further details regarding the conversion are described below, as well as in the above-referenced "z/Architecture Principles of Operation," IBM® Publication No. SA22-7832-08, Ninth Edition, August, 2010, which is hereby incorporated herein by reference in its entirety. The below description also provides details regarding the process of converting from DFP to zoned format In one example, for the double precision format, the most significant digit of the mantissa data to be converted to zoned format is contained in the combo field, which is bits 1-5 of the source data. Bit 0 is the sign bit, with a negative value being indicated with bit 0 being a '1'. Bits 6-13 are the exponent continuation field and are ignored by this operation. Bits 14-63 are the Encoded Trailing Significand and contain the remaining 15 digits of decimal data and are encoded in the DPD (densely packed decimal) format.

For the extended precision format, in one example, the most significant digit of the mantissa data to be converted to zoned format is contained in the combo field, which is bits 1-5 of the source data. Bit 0 is the sign bit, with a negative value being indicated with bit 0 being a '1'. Bits 6-17 are the exponent continuation field and are ignored by this operation. Bits 18-127 are the Encoded Trailing Significand and contain the remaining 33 digits of decimal data that are encoded in the DPD format, For both the double precision and extended precision formats, the trailing significand digits that are DPD encoded digits are converted from DPD format to BCD (binary coded decimal) format and the digit from the combo field (bits 1-5) is pre-pended to the beginning of those digits. The DPD to BCD conversion requires only a few gates, and through such gates, blocks of 10-bit DPD data is decompressed into blocks of 12-bit BCD data, such that each BCD block includes three 4-bit BCD numbers. The string of numbers is checked for leading zeros and is then compared to the $L_2$ field of the instruction to determine if an overflow situation occurs, and if it does, it zeros out the appropriate most significant digits (those being the digits that will not fit into the specified memory length (specified by $L_2$) once the data is expanded to zoned decimal format.

Next 4-bit Zone fields are inserted to the left of each BCD digit such that each byte (8-bits) now includes a 4-bit zone field followed by a 4-bit BCD digit. Each zone field is either "0011" or "1111" depending on whether the Z bit in the text is a 0 or a 1. Next, the sign bit from the DFP source operand is used to determine a sign code if S=1 in the instruction. If the BCD digits are all 0 and F=1, then the sign is ignored and a positive sign code created. Otherwise, the sign code generated is the sign of the DFP source operand from bit 0 and a negative sign is encoded as a "1101"; a positive sign is encoded as a "1100" if P=0 or as a "1111" if P=1. This sign code then replaces the field code to the left of the least significant BCD digit. (In one embodiment, the sign is processed in parallel to the field codes and is inserted to the left of the least significant BCD digit, instead of the field code.) This result is then written to memory.

Described in detail above are two machine instructions, CZDT and CZXT that convert a decimal floating point operand in a source floating point register or register pair to EBCDIC or ASCII data and store it to a target memory location. These instructions provide a means to significantly improve traditional storage-to-storage decimal workloads. Traditional storage-to-storage decimal unpack operations are able to process 15 digits and a sign requiring three overlapping unpack operations to process a 31-digit (and sign) result typically found in applications, such as COBOL applications. Having to break a result into smaller overlapping mini-results adds to the complexity of the compiler and impacts performance as it requires additional instructions to be executed to perform a given task. Since CZXT is capable of converting a DFP operand containing up to 34 digits and a sign code and storing it to memory in a single instruction, compilers can treat the common 31-digit and sign results (e.g., COBOL results) as a single entity, simplifying the compiled code and improving performance.

Previously, the process required using CSDTR or CSXTR to convert the data from the DFP format to the packed decimal format in GPRs. The data must then be stored out of GPRs to memory, but since there is no length controlled store currently in the instruction set architecture, this often required a mix of word, half-word, and byte store operations. Finally, an unpack or UNPKA operation is needed to convert the data in memory back to EBCDIC or ASCII. These new instructions allow the data to be converted from the DFP format directly to EBCDIC and ASCII in a single step. The CZDT or CZXT instruction replaces both the CSDTR/CSXTR and UNPK/UNPKA instructions.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 9:
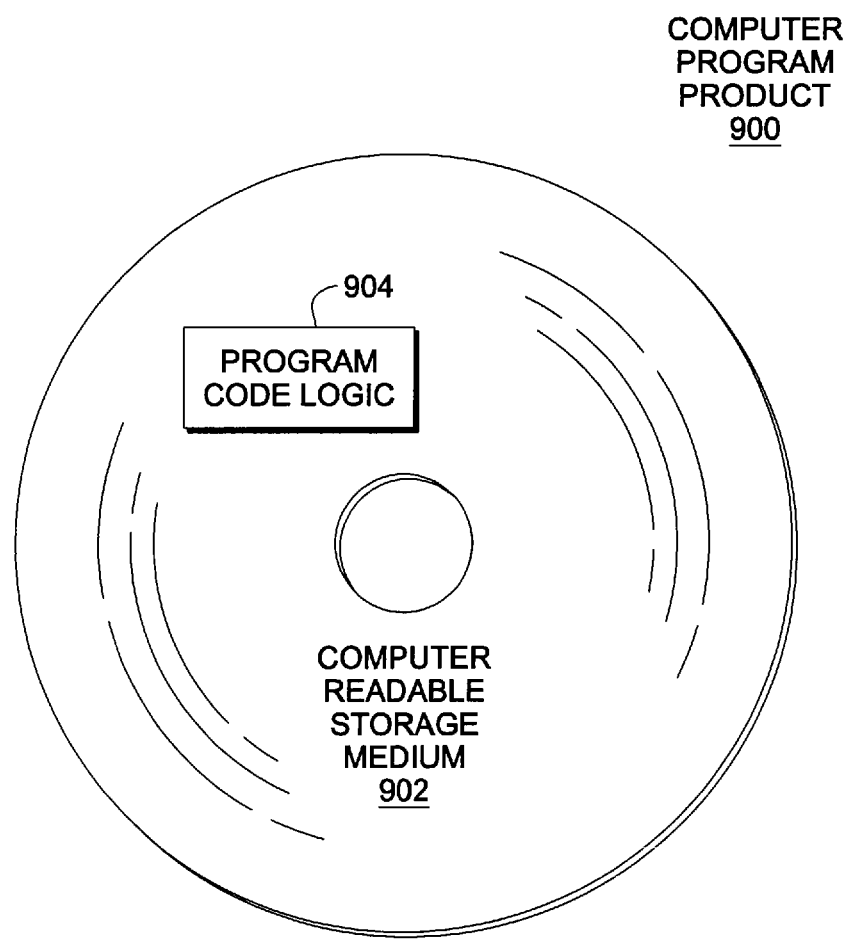
FIG. 9 depicts one embodiment of a computer program product incorporating one or more aspects of the present invention.

Referring now to FIG. 9, in one example, a computer program product 900 includes, for instance, one or more non-transitory computer readable storage media 902 to store computer readable program code means or logic 904 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, although certain fields and/or bits are described, others may be used as well. Additionally, some steps of the flow diagrams may be performed in parallel or in a differing order. Many changes and/or additions may be made without departing from the spirit of the present invention.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Other examples of computing environments that may incorporate and/or use one or more aspects of the present invention are described below.

Figure 10:
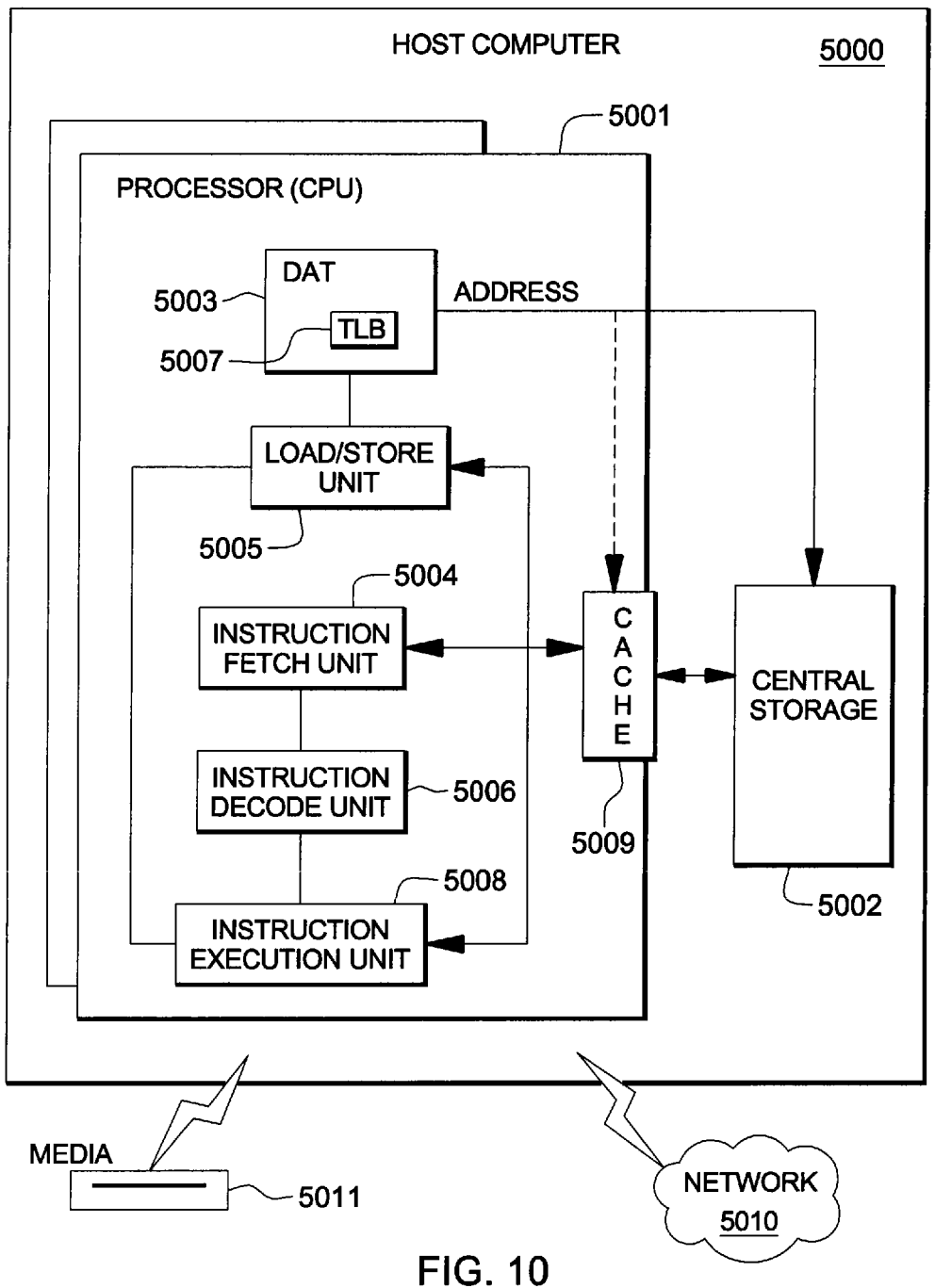
FIG. 10 depicts one embodiment of a host computer system to incorporate and use one or more aspects of the present invention.

Referring to FIG. 10, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture®). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with one or more aspects the present invention). Referring to FIG. 10, software program code which embodies one or more aspects of the present invention may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 11:
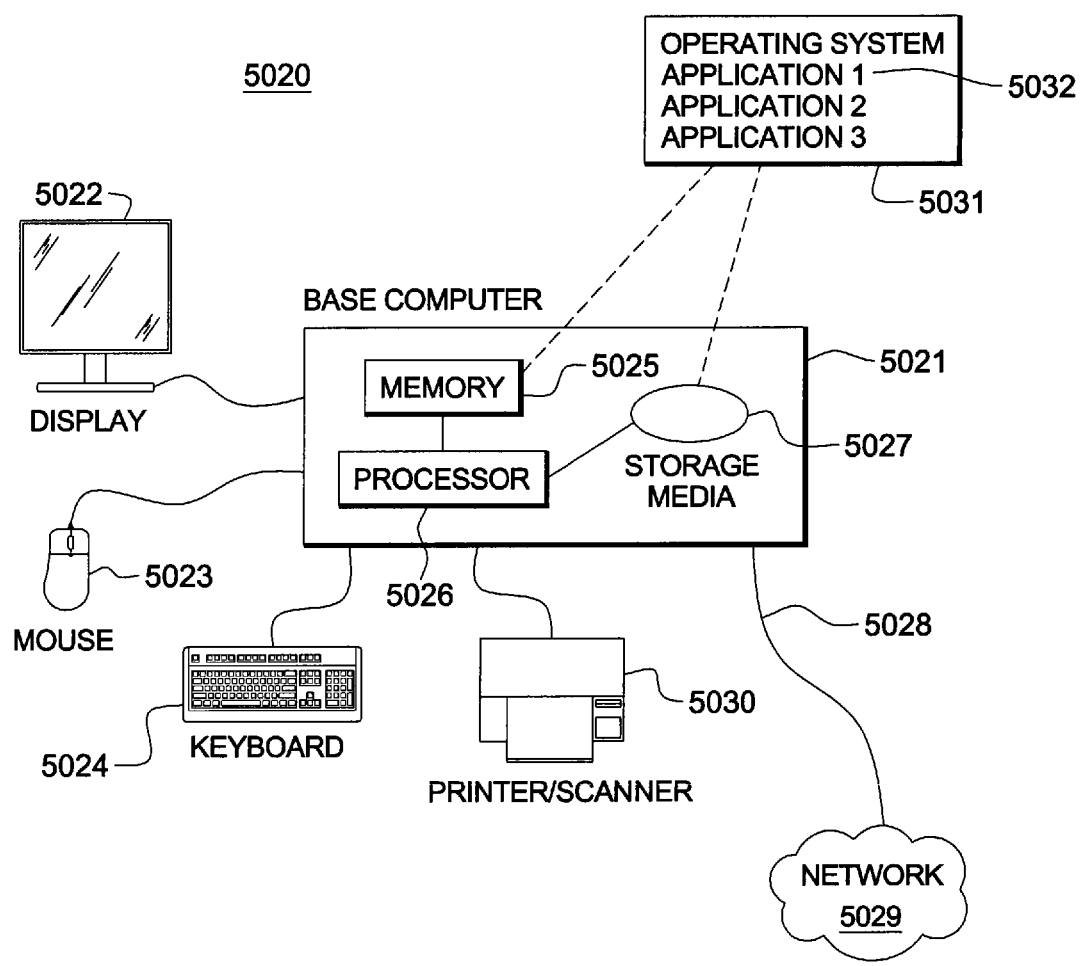
FIG. 11 depicts a further example of a computer system to incorporate and use one or more aspects of the present invention.

FIG. 11 illustrates a representative workstation or server hardware system in which one or more aspects of the present invention may be practiced. The system 5020 of FIG. 11 comprises a representative base computer system 5021, such as a personal computer, a workstation or a server, including optional peripheral devices. The base computer system 5021 includes one or more processors 5026 and a bus employed to connect and enable communication between the processor (s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 12:
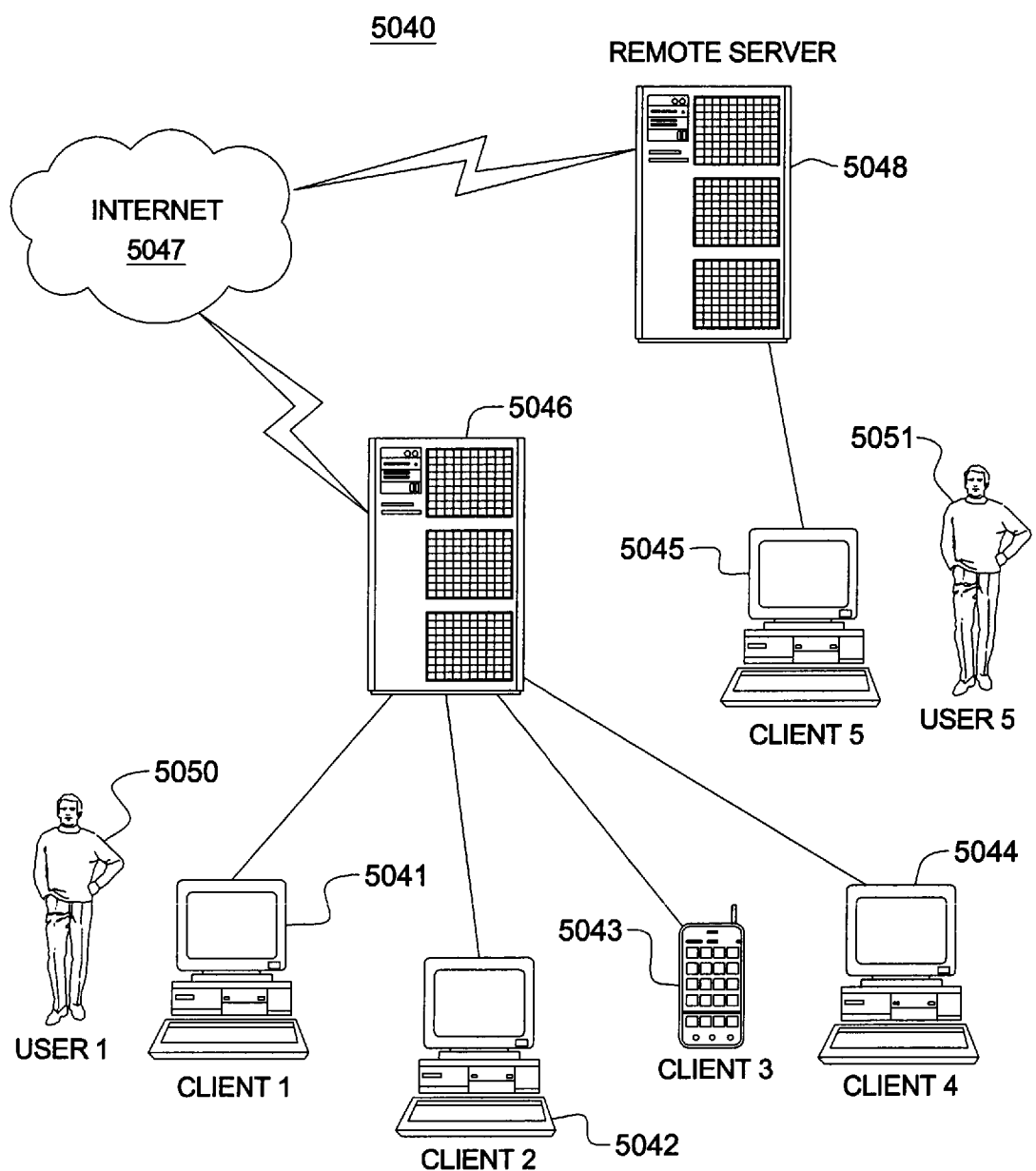
FIG. 12 depicts another example of a computer system comprising a computer network to incorporate and use one or more aspects of the present invention.

FIG. 12 illustrates a data processing network 5040 in which one or more aspects of the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 12, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System Z® server available from International Business Machines Corporation.

Referring concurrently to FIG. 11 and FIG. 12, software programming code which may embody one or more aspects of the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 13:
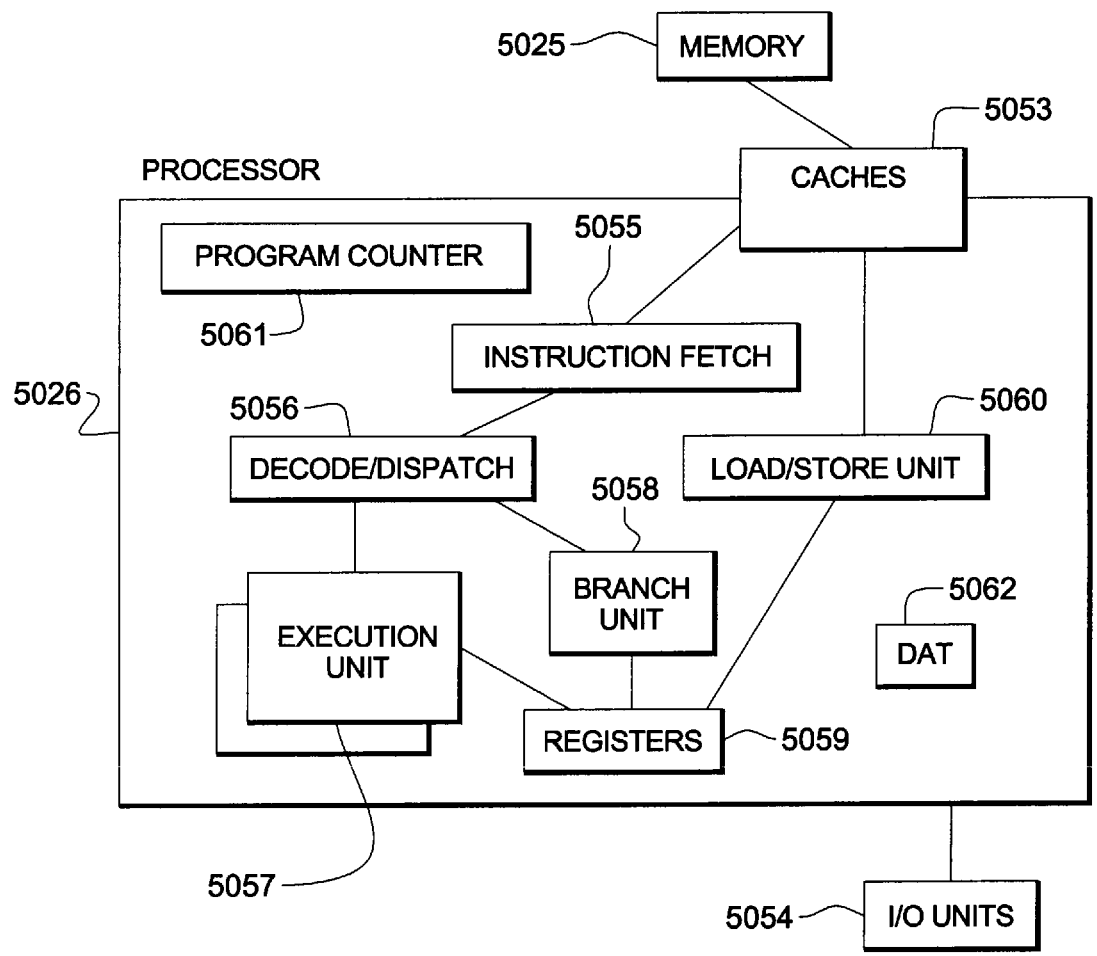
FIG. 13 depicts one embodiment of various elements of a computer system to incorporate and use one or more aspects of the present invention.

Referring to FIG. 13, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 14A:
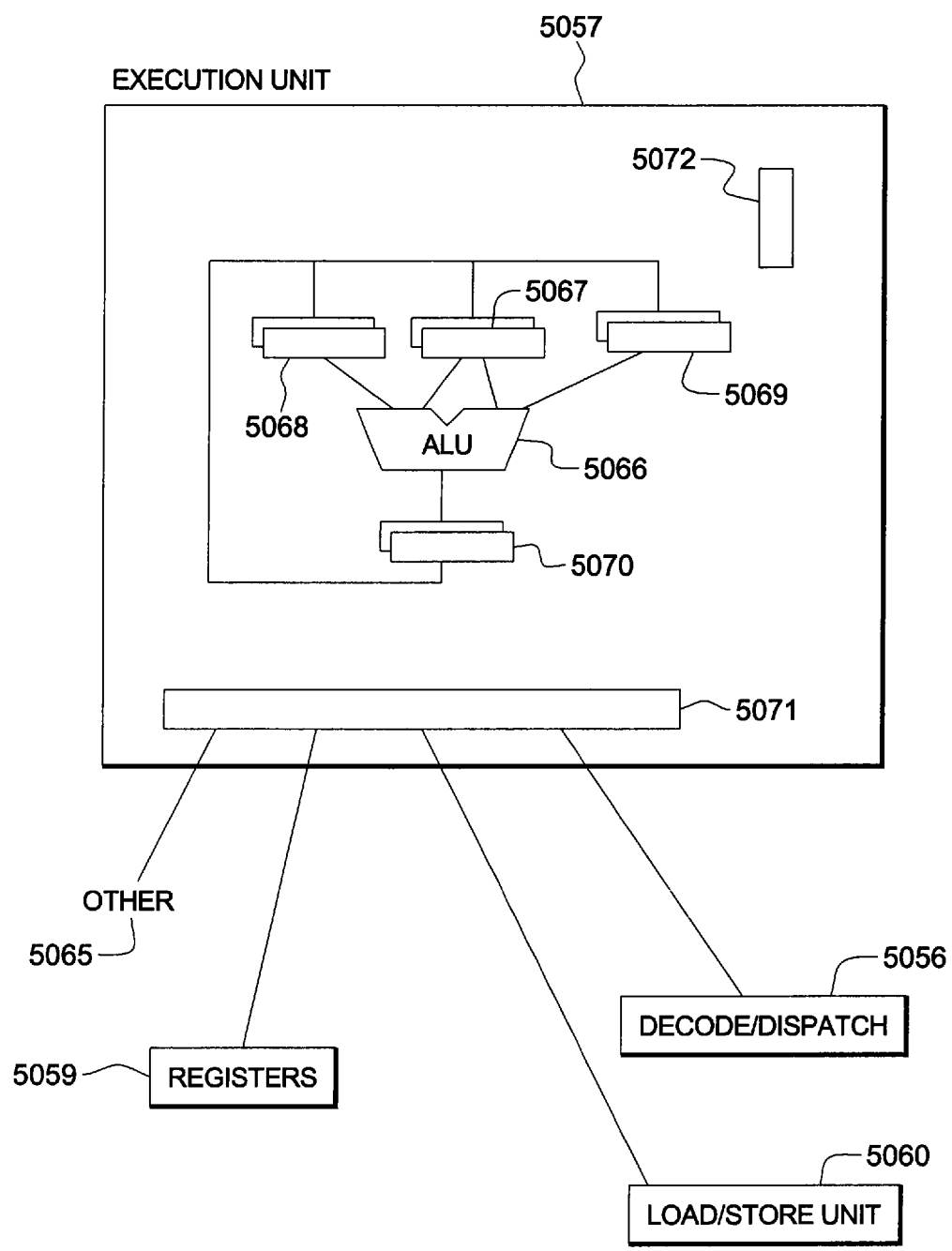
FIG. 14A depicts one embodiment of the execution unit of the computer system of FIG. 13 to incorporate and use one or more aspects of the present invention.

A processor 5026 typically has one or more units 5057, 5058, 5060 for executing the function of the instruction. Referring to FIG. 14A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 14B:
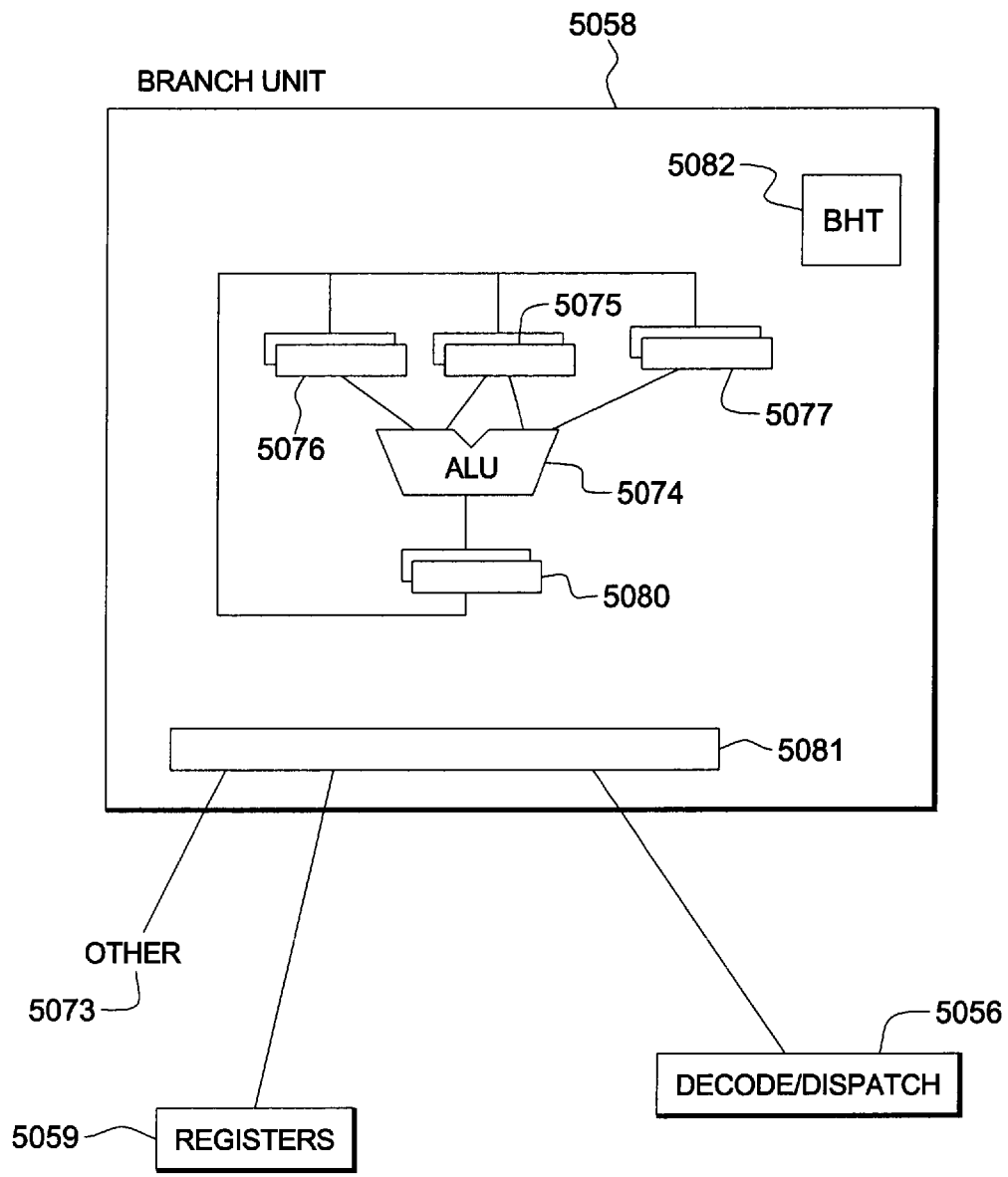
FIG. 14B depicts one embodiment of the branch unit of the computer system of FIG. 13 to incorporate and use one or more aspects of the present invention.

Referring to FIG. 14B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 14C:
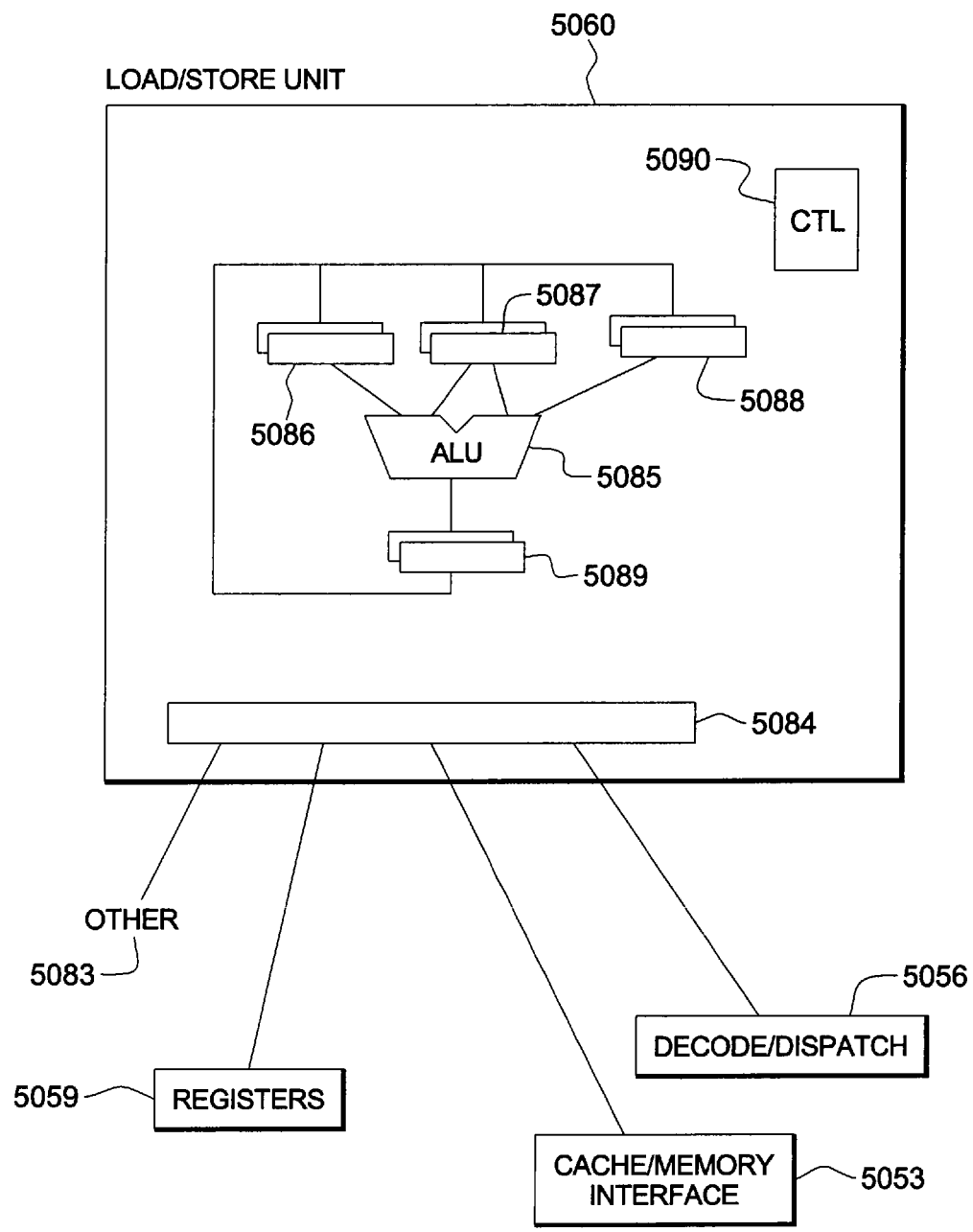
FIG. 14C depicts one embodiment of the load/store unit of the computer system of FIG. 13 to incorporate and use one or more aspects of the present invention.

Referring to FIG. 14C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 13) provide the processor with means for attaching to peripheral devices including tape, disc, printers, displays, and networks for example. I/O units are often presented to the computer program by software drivers. In mainframes, such as the System Z® from IBM®, channel adapters and open system adapters are I/O units of the mainframe that provide the communications between the operating system and peripheral devices.

Further, other types of computing environments can benefit from one or more aspects of the present invention. As an example, as mentioned herein, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System X® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 15:
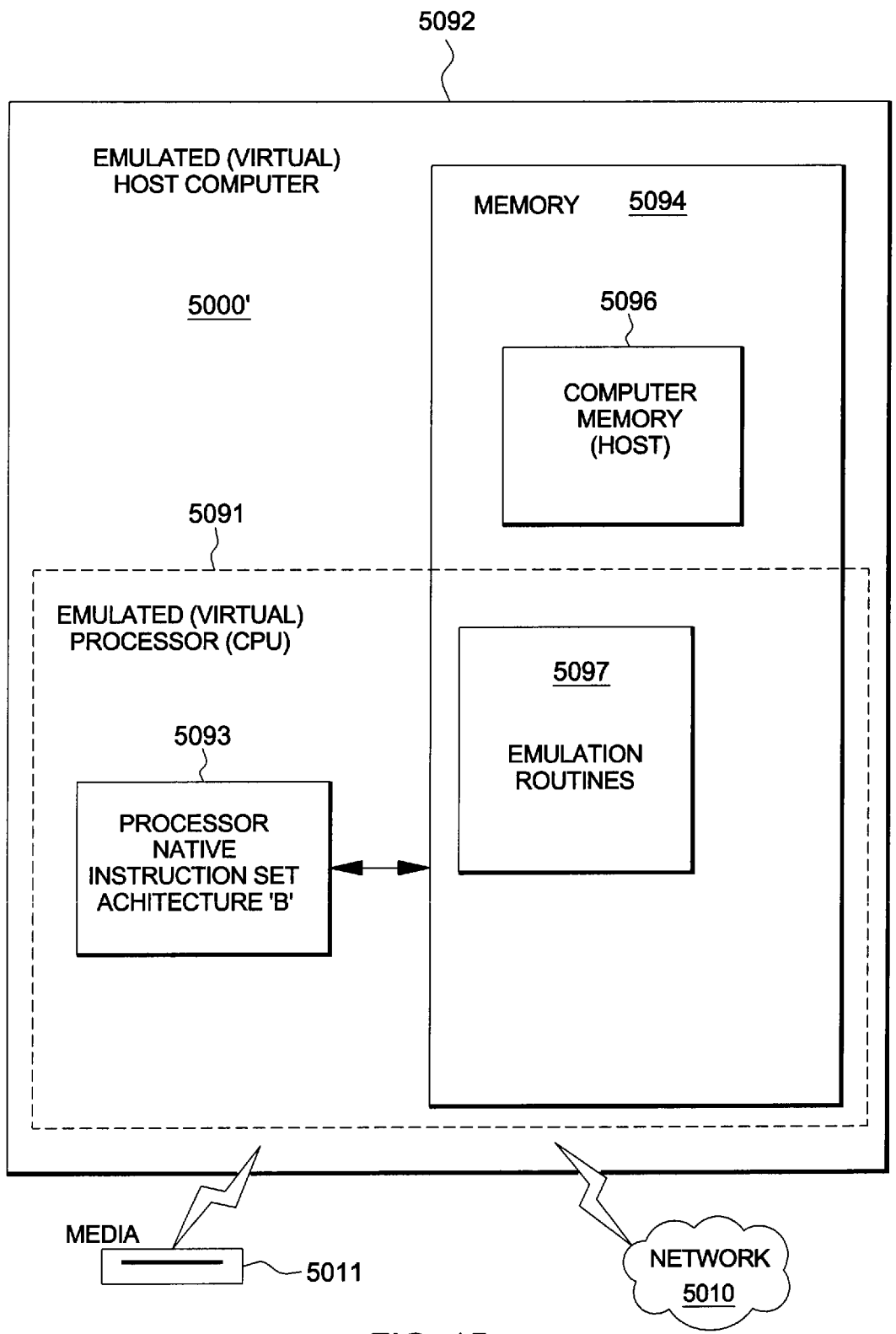
FIG. 15 depicts one embodiment of an emulated host computer system to incorporate and use one or more aspects of the present invention.

In FIG. 15, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of executing a machine instruction in a central processing unit, the method comprising:
    obtaining the machine instruction for execution, the machine instruction being defined for computer execution according to a computer architecture, the machine instruction comprising:
        at least one opcode field to provide an opcode, the opcode identifying a convert to zoned from decimal floating point function;
        a first register field designating a first register, the first register comprising a first operand;
        a second register field and a displacement field, wherein contents of a second register designated by the second register field are combined with contents of the displacement field to form an address of a second operand; and
        a mask field, the mask field comprising one or more controls used during execution of the machine instruction; and
    executing the machine instruction, the executing comprising:
        converting at least a portion of the first operand in a decimal floating point format to a zoned format without writing to an architected register of the computer architecture, wherein the converting comprises converting a first set of bits of the first operand to corresponding one or more zoned digits of a result, and providing a zone field for each zoned digit of the one or more zoned digits of the result; and
        placing the result at a location designated by the address of the second operand, wherein the result is stored to the location in the zoned format without issuing one or more additional machine instructions to convert the stored result to the zoned format.

2. The method of claim 1, wherein the opcode, when a first value, indicates a long decimal floating point source and a zoned result.

3. The method of claim 1, wherein the opcode, when a second value, indicates an extended decimal floating point source and a zoned result.

4. The method of claim 1, wherein the mask field comprises a sign control used to indicate whether the second operand has a sign field.

5. The method of claim 1, wherein the mask field comprises a plus-sign-code control used to encode a plus sign.

6. The method of claim 1, wherein the mask field comprises a force-plus-zero control used in determining a sign of a result placed in the second operand.

7. The method of claim 1, wherein the mask field comprises a sign field, and wherein the method further comprises using the sign field to determine a value for a sign field of the result stored in the second operand.

8. The method of claim 1, wherein the machine instruction comprises a length field specifying at least one of a number of rightmost significand digits of the first operand to be converted and a length of the second operand.

9. The method of claim 1, wherein the executing comprises reading the at least a portion of the first operand from at least one floating point register, and wherein the second operand to include the result is in memory.

10. The method of claim 1, wherein the converting further comprises:

determining whether a zone control indicator of the mask field is a given value;
selecting the zone field to provide for each zoned digit based on whether the zone control indicator is the given value;
determining whether a sign control indicator of the mask field is another given value, the sign control indicator indicating whether the second operand has a sign field; and
performing processing based on whether the second operand has the sign field, wherein at least a portion of the processing is selected from a group consisting of: (i) based on the second operand not having the sign field, storing binary coded decimal digits, a sign field, and field codes of the result to the location designated by the address of the second operand, and (ii) based on the second operand having the sign field, setting a sign of the result based on whether the zone control indicator of the mask field is the given value, and storing binary coded decimal digits, a sign field, and field codes of the result to the location designated by the address of the second operand.

\* \* \* \* \*